(12) United States Patent  
Ell et al.

(10) Patent No.: US 11,467,177 B2  
(45) Date of Patent: Oct. 11, 2022

(54) ACOUSTIC AIR DATA SYSTEM WITH RADIALLY PAIRED RECEIVERS

(71) Applicant: Rosemount Aerospace Inc., Burnsville, MN (US)

(72) Inventors: Todd Anthony Ell, Savage, MN (US); Jaime Sly, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 238 days.

(21) Appl. No.: 16/825,491

(22) Filed: Mar. 20, 2020

(65) Prior Publication Data

US 2021/0293846 A1   Sep. 23, 2021

(51) Int. Cl.

| | |
|---|---|
| *G01P 5/24* | (2006.01) |
| *B64D 43/02* | (2006.01) |
| *G01P 13/02* | (2006.01) |
| *G01S 11/14* | (2006.01) |
| *G01S 11/16* | (2006.01) |
| *G01C 23/00* | (2006.01) |
| *B64F 5/60* | (2017.01) |
| *B60W 40/10* | (2012.01) |
| *B60W 50/02* | (2012.01) |
| *B61K 9/00* | (2006.01) |

(52) U.S. Cl.
CPC ............ *G01P 5/245* (2013.01); *G01C 23/005* (2013.01); *B60W 40/10* (2013.01); *B60W 50/0205* (2013.01); *B60W 2420/54* (2013.01); *B61K 9/00* (2013.01); *B64F 5/60* (2017.01)

(58) Field of Classification Search  
None  
See application file for complete search history.

(56) References Cited

U.S. PATENT DOCUMENTS

| | | |
|---|---|---|
| 5,585,557 A | 12/1996 | Loschke et al. |
| 8,261,609 B2 | 9/2012 | Choisnet et al. |
| 9,121,860 B1 * | 9/2015 | Cronyn .................. G01P 5/245 |
| 9,612,252 B2 | 4/2017 | Waddington |
| 10,739,371 B2 | 8/2020 | Ell |
| 10,746,563 B2 | 8/2020 | Sly et al. |

(Continued)

OTHER PUBLICATIONS

Extended European Search Report for European Patent Application No. 21163820.0, dated Aug. 10, 2021, 5 pages.

(Continued)

*Primary Examiner* — Maceeh Anwari  
*Assistant Examiner* — Aarron E Santos  
(74) *Attorney, Agent, or Firm* — Kinney & Lange, P.A.

(57) ABSTRACT

An acoustic air data system includes first and second acoustic transmitters, an array of acoustic receivers, and control circuitry. The array is positioned to receive first and second acoustic signals. The control circuitry determines time difference of arrival (TDOA) of the first and second acoustic signals. The control circuitry determines, for each of a first and second set of acoustic receiver pairs, a signal velocity of the first and second acoustic signals, respectively, based on a distance between an inner acoustic receiver and an outer acoustic receiver and a corresponding TDOA for each pair of acoustic receivers. The control circuitry estimates one or more of wind angle, speed of sound, Mach number, and true airspeed of the airflow about the exterior of the vehicle based on parameters of a best fit circle.

20 Claims, 3 Drawing Sheets

(56) References Cited

U.S. PATENT DOCUMENTS

| | | | |
|---|---|---|---|
| 10,884,016 B2 | 1/2021 | Sly et al. | |
| 10,884,017 B2 | 1/2021 | Ell | |
| 10,900,990 B2 | 1/2021 | Matheis et al. | |
| 10,935,647 B2 | 3/2021 | Sly et al. | |
| 2004/0177693 A1 | 9/2004 | Tenoudji et al. | |
| 2016/0266250 A1 | 9/2016 | Dillon et al. | |
| 2019/0293677 A1* | 9/2019 | Ell | G01P 5/245 |
| 2019/0346278 A1 | 11/2019 | Sly et al. | |
| 2020/0018838 A1 | 1/2020 | Sly et al. | |
| 2020/0057092 A1 | 2/2020 | Ell | |
| 2020/0110110 A1 | 4/2020 | Matheis et al. | |
| 2020/0256888 A1* | 8/2020 | Ell | G01P 5/245 |
| 2020/0333371 A1 | 10/2020 | Sly et al. | |
| 2020/0363445 A1 | 11/2020 | Sly et al. | |
| 2021/0025916 A1 | 1/2021 | Sly et al. | |
| 2021/0078722 A1 | 3/2021 | Shannon et al. | |

OTHER PUBLICATIONS

D Cruette et al. "Fast temperature and true airspeed measurements with the Airborne Ultrasonic Anemometer-Thermometer (AUSAT)". In: Journal of Atmospheric and Oceanic Technology 17.8 (2000), pp. 1020-1039.

Alvaro Cuerva and Angel Sanz-Andrés. "On sonic anemometer measurement theory". In: Journal of wind engineering and industrial aerodynamics 88.1 (2000), pp. 25-55.

Heidi Schwartz et al. "Application of ultrasound for the estimation of flight velocity direction on an aircraft fuselage". In: Applied Acoustics 90 (2015), pp. 171-180.

* cited by examiner

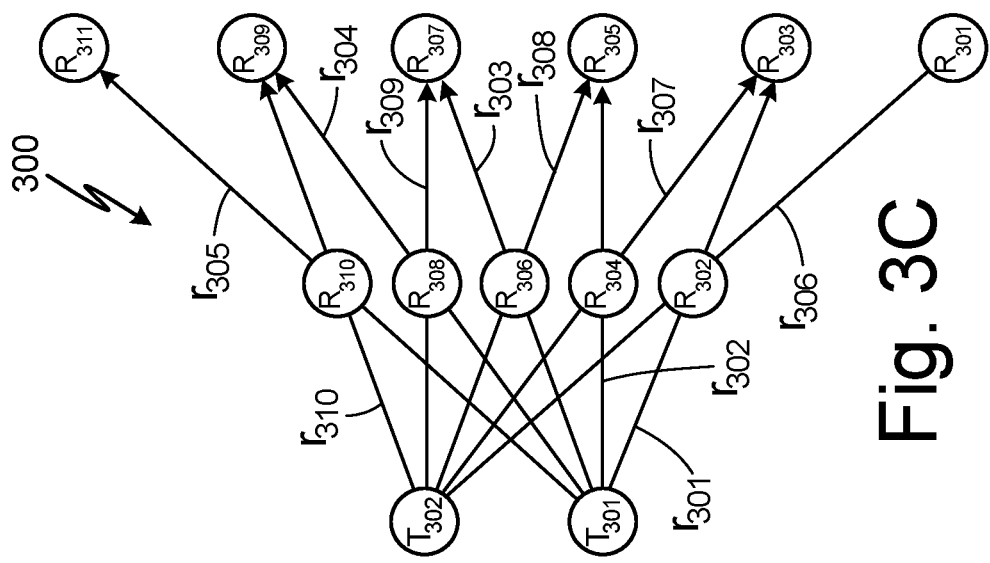
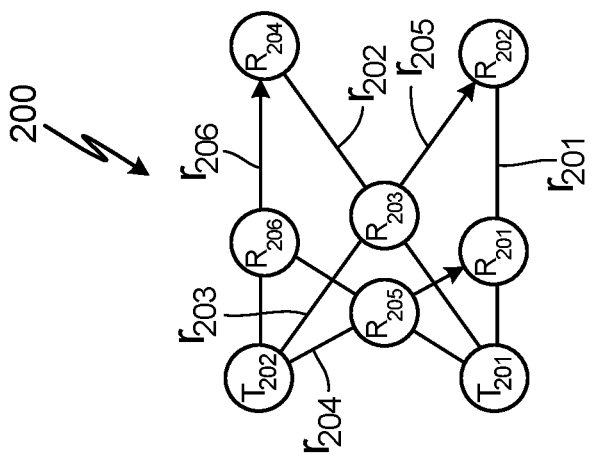
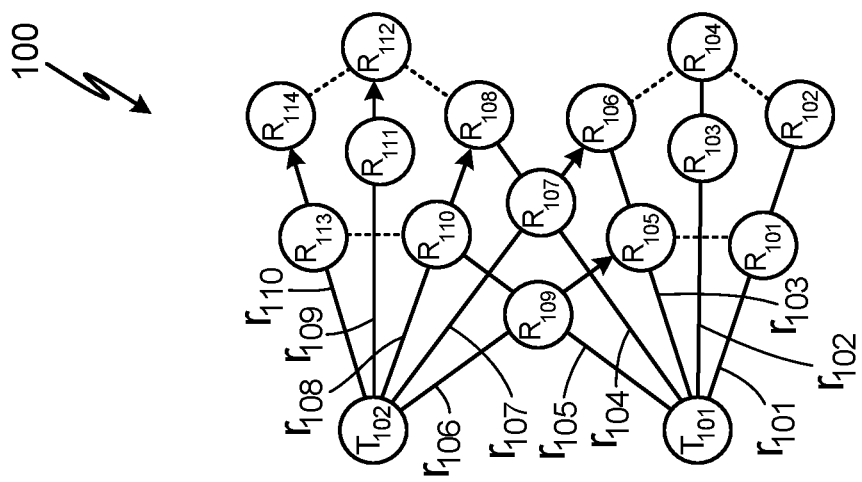
Fig. 3C
Fig. 3B
Fig. 3A

ACOUSTIC AIR DATA SYSTEM WITH RADIALLY PAIRED RECEIVERS

BACKGROUND

This disclosure relates generally to air data systems, and more specifically to acoustic air data systems.

Certain vehicles, such as aircraft, missiles, high speed ground vehicles, or other vehicles have incorporated air data systems that calculate air data outputs based on measured parameters collected from various sensors positioned about the vehicle. For instance, many aircraft air data systems utilize pneumatic air data probes (e.g., pitot and/or pitot-static probes) that measure pneumatic pressure of oncoming airflow about the aircraft exterior to generate aircraft air data outputs, such as true airspeed, calibrated airspeed, Mach number, altitude, angle of attack, angle of sideslip, or other air data parameters. Traditional angle of attack sensors typically work by aligning a rotating vane with local airflow about the aircraft exterior. The angle of the rotating vane is compared to a reference line of the aircraft, such as a horizontal reference line of the aircraft aligned with, e.g., a chord of a wind of the aircraft, to produce a measured angle of attack.

Traditional pneumatic and rotating vane sensors, however, can be susceptible to failure modes caused by icing and/or particulates within the airflow (e.g., volcanic ash). Ice buildup, for example, can prevent or inhibit rotation of an angle of attack vane, thereby decreasing accuracy of angle of attack measurements. Icing conditions and/or particulate buildup within a pneumatic pitot and/or pitot-static probe can similarly degrade performance of the pneumatic probe to accurately measure pressures of the oncoming airflow, thereby negatively impacting performance of the air data system. It is beneficial to have redundancy within the air data system to allow for detection and isolation of system faults without loss of function.

SUMMARY

In one example, an acoustic air data system includes a first acoustic transmitter, a second acoustic transmitter, an array of acoustic receivers, and control circuitry. The first acoustic transmitter is located to transmit a first acoustic signal into airflow about an exterior of a vehicle and is located along a first wind angle reference line. The second acoustic transmitter is located to transmit a second acoustic signal into the airflow about the exterior of the vehicle and is located along a second wind angle reference line. The second wind angle reference line is offset from the first wind angle reference line by an offset angle. The first acoustic transmitter is radially aligned with a first pair of acoustic receivers of the array to define a first radial line, the first acoustic transmitter is radially aligned with a second pair of acoustic receivers of the array to define a second radial line, and the first acoustic transmitter is radially aligned with a third pair of acoustic receivers of the array to define a third radial line. The first, second, and third radial lines form respective first angles with the first wind angle reference line and form a first set of acoustic receiver pairs. The second acoustic transmitter is radially aligned with a fourth pair of acoustic receivers of the array to define a fourth radial line, the second acoustic transmitter is radially aligned with a fifth pair of acoustic receivers of the array to define a fifth radial line, and the second acoustic transmitter is radially aligned with a sixth pair of acoustic receivers of the array to define a sixth radial line. The fourth, fifth, and sixth radial lines form respective second angles with the second wind angle reference line and form a second set of acoustic receiver pairs. Each of the first, second, and third pairs of acoustic receivers includes an inner acoustic receiver that is closer to the first acoustic transmitter and an outer acoustic receiver that is further from the first acoustic transmitter. Each of the fourth, fifth, and sixth pairs of acoustic receivers includes an inner acoustic receiver that is closer to the second acoustic transmitter and an outer acoustic receiver that is further from the second acoustic transmitter. The array is positioned to receive both the first and second acoustic signals. The control circuitry determines, for each of the first and second sets of acoustic receiver pairs, time difference of arrival (TDOA) of the first and second acoustic signals, respectively, from the inner acoustic receiver to the outer acoustic receiver. The control circuitry determines, for each of the first and second sets of acoustic receiver pairs, a signal velocity of the first and second acoustic signals, respectively, based on a distance between the inner acoustic receiver and the outer acoustic receiver and a corresponding TDOA for each pair of acoustic receivers. The control circuitry estimates a best fit circle using a best fit algorithm and a polar form of each of the signal velocities, wherein the best fit circle has a center ($c_x$, $c_y$) and a radius $C_r$ on a representative x-y coordinate plane. The control circuitry estimates one or more of wind angle, speed of sound, Mach number, and true airspeed of the airflow about the exterior of the vehicle based on parameters of the best fit circle, and outputs the one or more of the wind angle, speed of sound, Mach number, and true airspeed for operational control of the vehicle.

In another example, a method includes transmitting, by a first acoustic transmitter, a first acoustic signal into airflow about an exterior of a vehicle, wherein the first acoustic transmitter is located along a first wind angle reference line. The method further includes transmitting, by a second acoustic transmitter, a second acoustic signal into airflow about an exterior of a vehicle, wherein the second acoustic transmitter is located along a second wind angle reference line. The first and second wind angle reference lines are offset by an offset angle. The method further includes receiving the first and second acoustic signals at an array of acoustic receivers. The first acoustic transmitter is radially aligned with a first pair of acoustic receivers of the array to define a first radial line, the first acoustic transmitter is radially aligned with a second pair of acoustic receivers of the array to define a second radial line, and the first acoustic transmitter is radially aligned with a third pair of acoustic receivers of the array to define a third radial line. The first, second, and third radial lines form respective first angles with the first wind angle reference line and form a first set of acoustic receiver pairs. The second acoustic transmitter is radially aligned with a fourth pair of acoustic receivers of the array to define a fourth radial line, the second acoustic transmitter is radially aligned with a fifth pair of acoustic receivers of the array to define a fifth radial line, and the second acoustic transmitter is radially aligned with a sixth pair of acoustic receivers of the array to define a sixth radial line. The fourth, fifth, and sixth radial lines form respective second angles with the second wind angle reference line and form a second set of acoustic receiver pairs. Each of the first, second, and third pairs of acoustic receivers includes an inner acoustic receiver that is closer to the first acoustic transmitter and an outer acoustic receiver that is further from the first acoustic transmitter. Each of the fourth, fifth, and sixth pairs of acoustic receivers includes an inner acoustic receiver that is closer to the second acoustic transmitter and an outer acoustic receiver that is further from the second acoustic transmitter. The method further includes determining, for each of the first and second sets of acoustic receiver pairs, time difference of arrival (TDOA) of the first and second acoustic signals, respectively, from the inner acoustic receiver to the outer acoustic receiver. The method further includes determining, for each of the first and second sets of acoustic receiver pairs, a signal velocity of the first and second acoustic signals, respectively, based on a distance between the inner acoustic receiver and the outer acoustic receiver and a corresponding TDOA for each pair of acoustic receivers. The method further includes estimating a best fit circle using a best fit algorithm and a polar form of each of the signal velocities, wherein the best fit circle has a center ($c_x$, $c_y$) and a radius $C_r$ on a representative x-y coordinate plane. The method further includes estimating one or more of wind angle, speed of sound, Mach number, and true airspeed of the airflow about the exterior of the vehicle based on parameters of the best fit circle, and outputting the one or more of the wind angle, speed of sound, Mach number, and true airspeed for operational control of the vehicle.

BRIEF DESCRIPTION OF THE DRAWINGS

FIG. 3A is a top-down view of a further embodiment of an acoustic air data system illustrating additional radial pairs.

FIG. 3B is a top-down view of a further embodiment of an acoustic air data system illustrating irregular geometry.

FIG. 3C is a top-down view of a further embodiment of an acoustic air data system illustrating linear arrays.

DETAILED DESCRIPTION

As described herein, an acoustic air data system includes radially paired acoustic receivers located at known distances and angles from two acoustic transmitters. The acoustic transmitters produce acoustic signals that are influenced by airflow about the exterior of a vehicle as the signals propagate to the acoustic receivers. The effect of sound propagation speed between the transmitters and the receivers is separated from airflow velocity based on measured time difference of arrival of the acoustic signal and the known distances and angles between each transmitter and corresponding acoustic receivers. Accordingly, the determined airflow velocity information is used to estimate a best fit circle. The parameters of the best fit circle are directly related to air data parameters (e.g., relative wind angle, speed of sound, Mach number, and true airspeed). As such, an acoustic air data system implementing techniques of this disclosure can effectively produce air data parameters that are usable for operational control of the vehicle without requiring direct pressure measurements or angular rotation of a vane within the oncoming airflow. The radially paired acoustic receivers receiving acoustic signals from two different acoustic transmitters confers a level of redundancy and robustness to the acoustic air data system described herein, and allows for identification of system faults.

Figure 1:
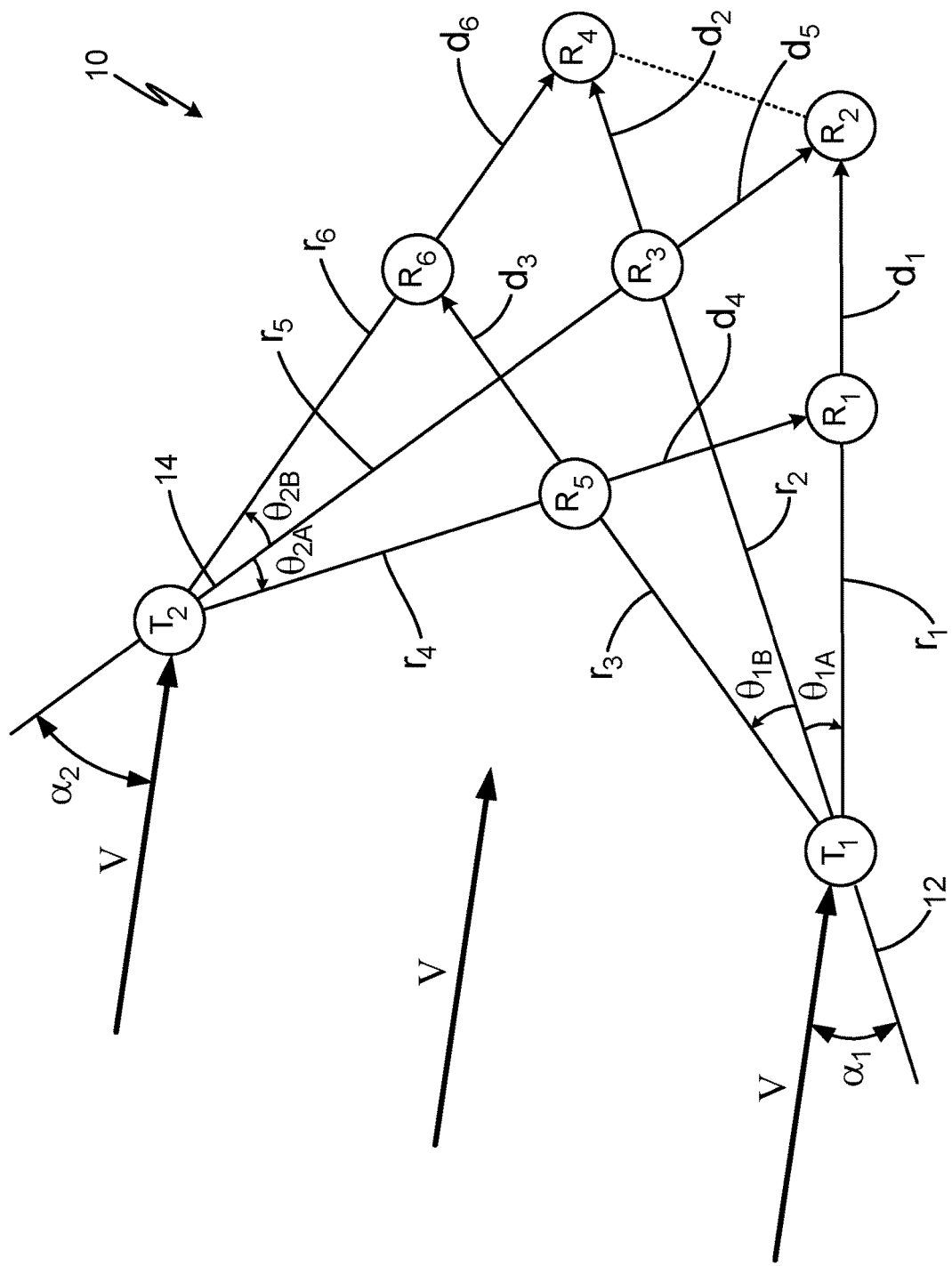
FIG. 1 is top-down view of an acoustic air data system disclosed herein.

FIG. 1 is top-down view of acoustic air data system 10. Acoustic air data system 10 includes first acoustic transmitter $T_1$, second acoustic transmitter $T_2$, and acoustic receivers $R_1$, $R_2$, $R_3$, $R_4$, $R_5$, and $R_6$. Acoustic air data sensing system 10 can be mounted on and/or otherwise incorporated into an exterior of a vehicle, such that an acoustic signal transmitted by first or second acoustic transmitter $T_1$ or $T_2$ is influenced by airflow over the exterior of the vehicle during propagation of the acoustic signal between first and second acoustic transmitters $T_1$ and $T_2$ and each of acoustic receivers $R_1$-$R_6$. While the examples provided herein are described with respect to acoustic air data sensing system 10 mounted on or otherwise incorporated into an aircraft, it should be understood that the techniques of this disclosure are applicable to any vehicle for which air data parameters are to be generated for, e.g., operational control of the vehicle. Examples of such vehicles to which acoustic air data sensing system 10 can be mounted on and/or incorporated into can include, e.g., air vehicles (e.g., aircraft, unmanned aerial vehicles, rotorcraft, drones, missiles, or other air vehicles), ground vehicles (e.g., automobiles, trains, rocket sleds, or other ground vehicles), or any other vehicle for which air data parameters, such as relative wind angle, speed of sound, Mach number, and true airspeed are to be generated for operational control of the vehicle.

In some examples, acoustic air data sensing system 10 is incorporated into a mounting plate or other structure configured to be flush-mounted with the exterior of the aircraft, such that edges of the mounting plate and the acoustic transmitter and receivers are aligned with (i.e., flush with) the exterior surface of the aircraft. Mounting of acoustic air data sensing system 10 flush with the exterior surface of the aircraft can reduce or eliminate aerodynamic and acoustic effects caused by the interface of the oncoming airflow with the mounting plate or the acoustic transmitter or receivers themselves. In other examples, any one or more of first acoustic transmitter $T_1$, second acoustic transmitter $T_2$, and acoustic receivers $R_1$-$R_6$ can be integrated into the exterior of the aircraft skin (e.g., and flush with the aircraft exterior skin) without the use of a mounting plate. In yet other examples, the mounting plate and/or first and second acoustic transmitters $T_1$ and $T_2$ and acoustic receivers $R_1$-$R_6$ of acoustic air data sensing system 10 can be mounted on the exterior of the aircraft such that edges of the mounting plate or any one or more of first and second acoustic transmitters $T_1$ and $T_2$ and acoustic receivers $R_1$-$R_6$ are not flush with the exterior of the aircraft. In such examples, aerodynamic and/or acoustic effects of the non-flush interface of the mounting plate, first and second acoustic transmitters $T_1$, and/or acoustic receivers $R_1$-$R_6$ can be characterized (e.g., in a wind tunnel) and compensated for during the air data parameter computations.

First and second acoustic transmitter $T_1$ and $T_2$ can be a piezoelectric speaker, a cone speaker, a micro-electro-mechanical systems (MEMS) speaker, or other electric-to-acoustic transducer. Acoustic receivers $R_1$-$R_6$ can be microphones including MEMS microphones, condenser microphones, or other acoustic-to-electric transducers. While the example of FIG. 1 illustrates six separate receivers (i.e., $R_1$-$R_6$), it should be understood that acoustic air data system 10 can include additional acoustic receivers (e.g., as described in greater detail below with respect to FIGS. 3A and 3B).

As illustrated in FIG. 1, each of acoustic receivers $R_1$-$R_6$ are located along lines extending radially from first acoustic transmitter $T_1$ and second acoustic transmitter $T_2$. That is, pairs of acoustic receivers $R_1$-$R_6$ are co-located (i.e., radially paired) along lines extending radially from first acoustic transmitter $T_1$, and different pairs of acoustic receivers $R_1$-$R_6$ are co-located along lines extending radially from second acoustic transmitter $T_2$. In the example of FIG. 1, pairs of acoustic receivers $R_1$ and $R_2$, $R_3$ and $R_4$, and $R_5$ and $R_6$ are located along lines extending radially from first acoustic transmitter $T_1$, and pairs of acoustic receivers $R_5$ and $R_1$, $R_3$ and $R_2$, and $R_6$ and $R_4$ are located along lines extending radially from second acoustic transmitter $T_2$.

As is further illustrated in FIG. 1, acoustic receivers $R_1$ and $R_2$ are located along radial line $r_1$ extending from first acoustic transmitter $T_1$, such that acoustic receiver $R_2$ is located at a radial distance equal to $r_1$ from first acoustic transmitter $T_1$. Acoustic receiver $R_1$ is relatively closer (e.g., relatively inner) to first acoustic transmitter $T_1$, acoustic receiver $R_2$ is relatively further (e.g., relatively outer) from first acoustic transmitter $T_1$, and acoustic receivers $R_1$ and $R_2$ are separated along radial line $r_1$ by distance $d_1$. Acoustic receivers $R_3$ and $R_4$ are located along radial line $r_2$ extending from first acoustic transmitter $T_1$, such that acoustic receiver $R_4$ is located at a radial distance equal to $r_2$ from first acoustic transmitter $T_1$. Acoustic receiver $R_3$ is relatively closer to first acoustic transmitter $T_1$, acoustic receiver $R_4$ is relatively further from first acoustic transmitter $T_1$, and acoustic receivers $R_3$ and $R_4$ are separated along radial line $r_2$ by distance $d_2$. Acoustic receivers $R_5$ and $R_6$ are located along radial line $r_3$ extending from first acoustic transmitter $T_1$, such that acoustic receiver $R_6$ is located at a radial distance equal to $r_3$ from first acoustic transmitter $T_1$. Acoustic receiver $R_5$ is relatively closer to first acoustic transmitter $T_1$, acoustic receiver $R_6$ is relatively further from first acoustic transmitter $T_1$, and acoustic receivers $R_5$ and $R_6$ are separated along radial line $r_3$ by distance $d_3$. Thus, a first set of radial lines (i.e., radial lines $r_1$-$r_3$) corresponds to first acoustic transmitter $T_1$ and a first set of radially paired acoustic receivers. Acoustic receivers $R_1$, $R_3$, and $R_5$ are radially inner along radial lines $r_1$-$r_3$, respectively, with respect to first acoustic transmitter $T_1$. Acoustic receivers $R_2$, $R_4$, and $R_6$ are radially outer along radial lines $r_1$-$r_3$, respectively, with respect to first acoustic transmitter $T_1$.

Similarly, acoustic receivers $R_5$ and $R_1$ are located along radial line $r_4$ extending from second acoustic transmitter $T_2$, such that acoustic receiver $R_1$ is located at a radial distance equal to $r_4$ from second acoustic transmitter $T_2$. Acoustic receiver $R_5$ is relatively closer to second acoustic transmitter $T_2$, acoustic receiver $R_1$ is relatively further from second acoustic transmitter $T_2$, and acoustic receivers $R_5$ and $R_1$ are separated along radial line $r_4$ by distance $d_4$. Acoustic receivers $R_3$ and $R_2$ are located along radial line $r_5$ extending from second acoustic transmitter $T_2$, such that acoustic receiver $R_2$ is located at a radial distance equal to $r_5$ from second acoustic transmitter $T_2$. Acoustic receiver $R_3$ is relatively closer to second acoustic transmitter $T_2$, acoustic receiver $R_2$ is relatively further from second acoustic transmitter $T_2$, and acoustic receivers $R_3$ and $R_2$ are separated along radial line $r_5$ by distance $d_5$. Acoustic receivers $R_6$ and $R_4$ are located along radial line $r_6$ extending from second acoustic transmitter $T_2$, such that acoustic receiver $R_4$ is located at a radial distance equal to $r_6$ from second acoustic transmitter $T_2$. Acoustic receiver $R_6$ is relatively closer to second acoustic transmitter $T_2$, acoustic receiver $R_4$ is relatively further from second acoustic transmitter $T_2$, and acoustic receivers $R_6$ and $R_4$ are separated along radial line $r_6$ by distance $d_6$. Thus, a second set of radial lines (i.e., radial lines $r_4$-$r_6$) corresponds to second acoustic transmitter $T_2$ and a second set of radially paired acoustic receivers. Acoustic receivers $R_5$, $R_3$, and $R_6$ are radially inner along radial lines $r_4$-$r_6$, respectively, with respect to second acoustic transmitter $T_2$. Acoustic receivers $R_1$, $R_2$, and $R_4$ are radially outer along radial lines $r_4$-$r_6$, respectively, with respect to second acoustic transmitter $T_2$.

In the example of FIG. 1, acoustic receivers $R_1$-$R_6$ form an array such that one of acoustic receivers $R_1$-$R_6$ is located at each of a center and vertices of a regular pentagon. Thus, the distances $d_1$-$d_6$ between corresponding paired acoustic receivers as described above can define the dimensions and geometry of a regular pentagon, which can have varying size. The distances between acoustic transmitters and acoustic receivers and between acoustic receivers can be selected to accommodate an operational sensitivity of the acoustic receivers (e.g., approximately 1-10 inches). It should be understood that in other examples (e.g., as described below with respect to FIGS. 3A-3C), the array of acoustic receivers can include more than six acoustic receivers, and the array of acoustic receivers can be positioned based on other regular or irregular geometries.

As is further illustrated in FIG. 1, first acoustic transmitter $T_1$ can be located along first wind angle reference line 12, and second acoustic transmitter $T_2$ can be located along second wind angle reference line 14. First wind angle reference line 12 and second wind angle reference line 14 can be offset from each other by a known angle (not labelled in FIG. 1), such that corresponding measurements are related by the known angle of offset.

First wind angle reference line 12 and second wind angle reference line 14 are reference lines of the aircraft corresponding to one of an angle of attack and an angle of sideslip of the aircraft upon which acoustic air data system 10 is mounted. For instance, acoustic air data system 10 can be mounted on an aircraft in a location that enables acoustic air data system 10 to measure the relative wind angle corresponding to angle of attack of the aircraft, such as on a side of the aircraft. In such examples, first wind angle reference line 12 and second wind angle reference line 14 are reference lines of the aircraft corresponding to aircraft angle of attack, such as a chord of a wing of the aircraft corresponding to a known (i.e., reference) aircraft angle of attack (e.g., zero degrees angle of attack). In other examples, acoustic air data system 10 can be mounted on an aircraft in a location that enables acoustic air data system 10 to measure the relative wind angle corresponding to an angle of sideslip of the aircraft, such as on a top or bottom of the aircraft. In such examples, first wind angle reference line 12 and second wind angle reference line 14 are reference lines of the aircraft corresponding to aircraft angle of sideslip, such as a line extending between the nose and the tail of the aircraft corresponding to a known (i.e., reference) aircraft angle of sideslip (e.g., zero degrees angle of sideslip).

Each of acoustic receivers $R_1$-$R_6$ can be located at a respective angle with respect to first wind angle reference line 12. Because first wind angle reference line 12 and each of radial lines $r_1$-$r_3$ intersect at first acoustic transmitter $T_1$, pairs of acoustic receivers (i.e., acoustic receivers $R_1$ and $R_2$, $R_3$ and $R_4$, and $R_5$ and $R_6$) are positioned at a same angle with respect to first wind angle reference line 12. That is, radial line $r_1$ and corresponding acoustic receivers $R_1$ and $R_2$ are positioned at angle $f_{1a}$ with respect to first wind angle reference line 12. Radial line $r_2$ and corresponding acoustic receivers $R_3$ and $R_4$ are positioned at an angle equal to zero degrees with respect to first wind angle reference line 12. Radial line $r_3$ and corresponding acoustic receivers $R_5$ and $R_6$ are positioned at angle $\theta_{1B}$ with respect to first wind angle reference line 12. It should be understood that one of $\theta_{1A}$ and $\theta_{1B}$ can have a negative directional component with respect to first wind angle reference line 12. For simplicity, as illustrated in FIG. 1, first wind angle reference line 12 can be chosen such that one pair of acoustic receivers (e.g., acoustic receivers $R_3$ and $R_4$) are aligned along first wind angle reference line 12 (i.e., radial line $r_2$ and corresponding acoustic receivers $R_3$ and $R_4$ are positioned at an angle of zero degrees with respect to first wind angle reference line 12). It should be understood, however, that other embodiments can include radial line $r_2$ and corresponding acoustic receivers $R_3$ and $R_4$ positioned at a non-zero angle with respect to first wind angle reference line 12.

Each of acoustic receivers $R_1$-$R_6$ can also be located at a respective angle with respect to second wind angle reference line 14. Because second wind angle reference line 14 and each of radial lines $r_4$-$r_6$ intersect at second acoustic transmitter $T_2$, corresponding pairs of acoustic receivers (i.e., acoustic receivers $R_5$ and $R_1$, $R_3$ and $R_2$, and $R_6$ and $R_4$) are positioned at a same angle with respect to second wind angle reference line 14. That is, radial line $r_4$ and corresponding acoustic receivers $R_5$ and $R_1$ are positioned at angle $\theta_{2A}$ with respect to second wind angle reference line 14. Radial line $r_5$ and corresponding acoustic receivers $R_3$ and $R_2$ are positioned at an angle equal to zero degrees with respect to second wind angle reference line 14. Radial line $r_6$ and corresponding acoustic receivers $R_6$ and $R_4$ are positioned at angle $\theta_{2B}$ with respect to second wind angle reference line 14. It should be understood that one of $\theta_{2A}$ and $\theta_{2B}$ can have a negative directional component with respect to second wind angle reference line 14. For simplicity, as illustrated in FIG. 1, second wind angle reference line 14 can be chosen such that one pair of acoustic receivers (e.g., acoustic receivers $R_3$ and $R_2$) are aligned along second wind angle reference line 14 (i.e., radial line $r_5$ and corresponding acoustic receivers $R_3$ and $R_2$ are positioned at an angle of zero degrees with respect to second wind angle reference line 14). It should be understood, however, that other embodiments can include radial line $r_5$ and corresponding acoustic receivers $R_3$ and $R_2$ positioned at a non-zero angle with respect to second wind angle reference line 14.

In some examples, multiple acoustic air data systems 10 can be mounted on or otherwise incorporated into the aircraft, such as at multiple orientations and/or locations to provide relative wind angle measurements corresponding to multiple wind angle reference lines (e.g., first wind angle reference lines 12 and second wind angle reference lines 14). For instance, in certain examples, a first acoustic air data system 10 can be mounted on the aircraft in a first location (e.g., a side of the aircraft) that enables the first acoustic air data system 10 to measure the relative wind angle corresponding to angle of attack of the aircraft, and a second acoustic air data system 10 can be mounted on the aircraft in a second location (e.g., a top or bottom of the aircraft) that enables the second acoustic air data system 10 to measure the relative wind angle corresponding to angle of sideslip of the aircraft. Accordingly, such multiple acoustic air data systems 10 can provide air data parameter measurements corresponding to both angle of attack and angle of sideslip for operational control of the aircraft.

As illustrated in FIG. 1, each of acoustic receivers $R_1$-$R_6$ can be located downstream (e.g., aft) of both first acoustic transmitter $T_1$ and second acoustic transmitter $T_2$, though in other examples, the array of acoustic receivers $R_1$-$R_6$ can be located upstream (e.g., forward) of both first acoustic transmitter $T_1$ and second acoustic transmitter $T_2$, or any one or more of the array of acoustic receivers $R_1$-$R_6$ can be located upstream of the first and second acoustic transmitters $T_1$ and $T_2$ and the remaining ones of the array of acoustic receivers $R_1$-$R_6$ can be located downstream. Locating receivers $R_1$-$R_6$ downstream of the acoustic transmitters $T_1$ and $T_2$, rather than upstream of the acoustic transmitters $T_1$ and $T_2$, can help to mitigate airflow boundary layer velocity effects that bend sound waves traveling upstream in the airflow in a direction that is away from the exterior surface of the aircraft (i.e., the mounting surface of acoustic air data system 10). Such bending (i.e., away from the aircraft skin) can attenuate the acoustic signal at the upstream receivers, thereby decreasing the signal-to-noise ratio at the upstream receivers and causing decreased accuracy of air data parameter computations that are based on the acoustic signal received at the upstream receivers. The same airflow boundary layer velocity effects, however, also cause bending of sound waves traveling downstream in the airflow in a direction that is toward the exterior surface of the aircraft. Such bending (i.e., toward the aircraft skin) can increase the strength of the acoustic signal received at the downstream receivers, thereby increasing the signal-to-noise ratio at the downstream receivers. Accordingly, in certain examples, such as the example of FIG. 1, each of the receivers $R_1$-$R_6$ can be located downstream (i.e., aft) of both first acoustic transmitter $T_1$ and second acoustic transmitter $T_2$ to alleviate the shadowing effect (i.e., signal attenuation) at upstream receivers that is exacerbated with greater air velocities.

In operation, acoustic air data system 10 experiences airflow as it passes over the aircraft exterior, which is illustrated in the example of FIG. 1 as arbitrary airflow velocity vector V. The direction of travel of airflow velocity vector V forms first relative wind angle $\alpha_1$ with respect to first wind angle reference line 12 and second relative wind angle $\alpha_2$ with respect to second wind angle reference line 14. The magnitude of airflow velocity vector V represents the speed of the airflow (or true airspeed) of the airflow about the aircraft exterior.

First acoustic transmitter $T_1$ emits a first acoustic signal into the airflow about the aircraft exterior. The first acoustic signal, affected by the airflow velocity vector V, propagates to each of acoustic receivers $R_1$-$R_6$, which receive the first acoustic signal at varying times. As is further described below, acoustic air data system 10 includes control circuitry (e.g., control circuitry 16 in FIG. 2) that determines time difference of arrival (TDOA) of the emitted first acoustic signal to each radially paired acoustic receiver corresponding to radial lines $r_1$-$r_3$ (i.e., between acoustic receivers $R_1$ and $R_2$, $R_3$ and $R_4$, and $R_5$ and $R_6$). The TDOA is determined based on the difference between the various times at which the first acoustic signal reaches the relatively closer one of the radially paired acoustic receivers (i.e., acoustic receivers $R_1$, $R_3$, and $R_5$) and the various times at which the first acoustic signal is received at the relatively further one of the radially paired acoustic receivers (i.e., acoustic receivers $R_2$, $R_4$, and $R_6$). The control circuitry determines signal velocities of the first acoustic signal for each radially paired acoustic receiver corresponding to radial lines $r_1$-$r_3$ (i.e., between acoustic receivers $R_1$ and $R_2$, $R_3$ and $R_4$, and $R_5$ and $R_6$) based on the respective TDOA and the corresponding known distances $d_1$-$d_3$ between radially paired acoustic receivers $R_1$ and $R_2$, $R_3$ and $R_4$, and $R_5$ and $R_6$, respectively. Using the determined signal velocities and the known angles $\theta_{1a}$, 0°, and $\theta_{1B}$ of the respective radially paired acoustic receivers $R_1$ and $R_2$, $R_3$ and $R_4$, and $R_5$ and $R_6$ as shown in FIG. 1, the control circuitry determines a polar form of each of the signal velocities.

Second acoustic transmitter $T_2$ emits a second acoustic signal into the airflow about the aircraft exterior. The second acoustic signal, affected by the airflow velocity vector V, propagates to each of acoustic receivers $R_1$-$R_6$, which receive the second acoustic signal at varying times. As is further described below, acoustic air data system 10 includes control circuitry (e.g., control circuitry 16 in FIG. 2) that determines TDOA of the emitted second acoustic signal to each radially paired acoustic receiver corresponding to radial lines $r_4$-$r_6$ (i.e., between acoustic receivers $R_5$ and $R_1$, $R_3$ and $R_2$, and $R_6$ and $R_4$). The TDOA is determine based on the difference between the various times at which the second acoustic signal reaches the relatively closer one of the radially paired acoustic receivers (i.e., acoustic receivers $R_5$, $R_3$, and $R_6$) and the various times at which the second acoustic signal is received at the relatively further one of the radially paired acoustic receivers (i.e., acoustic receivers $R_1$, $R_2$, and $R_4$). The control circuitry determines signal velocities of the second acoustic signal for each radially paired acoustic receiver corresponding to radial lines $r_4$-$r_6$ (i.e., between acoustic receivers $R_5$ and $R_1$, $R_3$ and $R_2$, and $R_6$ and $R_4$) based on the respective TDOA and the corresponding known distances $d_4$-$d_6$ between radially paired acoustic receivers $R_5$ and $R_1$, $R_3$ and $R_2$, and $R_6$ and $R_4$, respectively. Using the determined signal velocities and the known angles $\theta_{2A}$, 0°, and $\theta_{2B}$ of the respective radially paired acoustic receivers $R_5$ and $R_1$, $R_3$ and $R_2$, and $R_6$ and $R_4$ as shown in FIG. 1, the control circuitry determines a polar form of each of the signal velocities and estimates a best fit circle from these signal velocities.

Furthermore, the first set of radial lines (i.e., radial lines $r_1$-$r_3$) are related to the second set of radial lines (i.e., radial lines $r_4$-$r_6$) by the offset angle between first wind angle reference line 12 and second wind angle reference line 14. Thus, the polar forms of each of the signal velocities calculated for the second set of radial lines can be transposed onto a same x-y coordinate system as the polar forms of each of the signal velocities calculated for the first set of radial lines, or vice versa.

As is further described below, the control circuitry can take advantage of the radially paired configuration of acoustic receivers $R_1$-$R_6$, such that the control circuitry can identify and isolate corrupted ones of the acoustic receivers $R_1$-$R_6$. Acoustic air data system 10 determines air data parameter outputs, including one or more of relative wind angle of the airflow (i.e., $\alpha_1$ and/or $\alpha_2$), speed of sound, Mach number, and true airspeed of the airflow based on the parameters of the best fit circle. The air data parameter outputs are transmitted to one or more consuming systems, such as an aircraft flight management system (FMS), autoflight control system (AFCS), electronic flight instrument system (EFIS), or other consuming systems, which use the received air data parameter outputs for operational control of the aircraft.

Accordingly, acoustic air data system 10, implementing techniques of this disclosure, can determine aircraft air data parameters, such as angle of attack and/or angle of sideslip, Mach number, and true airspeed of the airflow, based on propagation of emitted acoustic signals from two acoustic transmitters $T_1$ and $T_2$ that are received at radially paired acoustic receivers $R_1$-$R_6$. The combination of two acoustic transmitters and an array of six acoustic receivers described herein provides a minimal necessary configuration for an acoustic air data system with redundancy to detect and isolate faults without loss of function. In applications where space is limited (e.g., on an aircraft), it is beneficial to implement system redundancy with the fewest additional components. Additionally, the use of dual acoustic transmitters in acoustic air data system 10 provides higher reliability by reducing both total on-time and switching frequency for a single acoustic transmitter. Acoustic air data system with the minimal redundant configuration can also be utilized as a building block for more complex configurations or acoustic air data systems.

Figure 2:
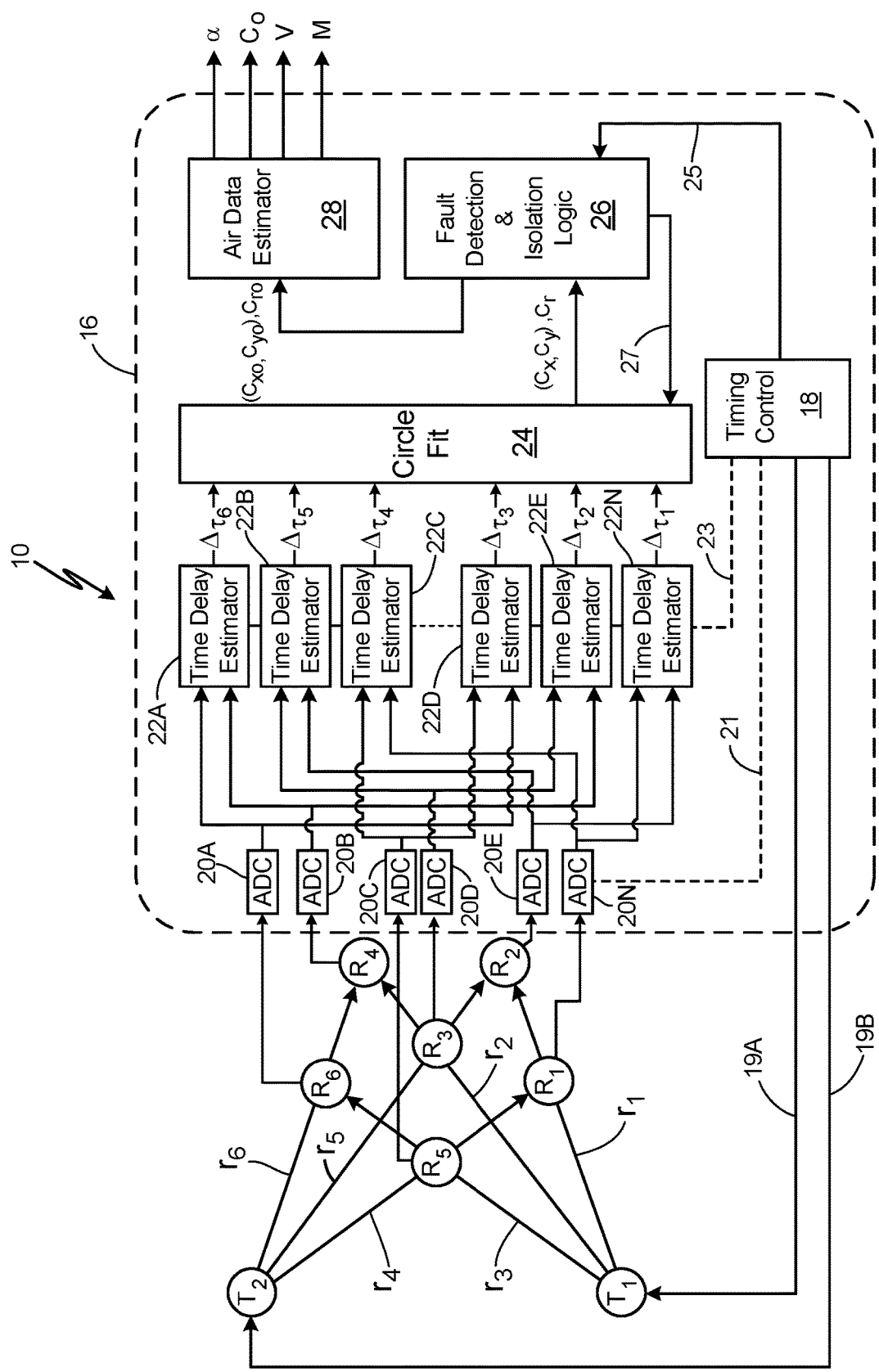
FIG. 2 is a schematic block diagram illustrating further details of the acoustic air data system with control circuitry to produce air data outputs.

FIG. 2 is a schematic block diagram illustrating further details of acoustic air data system 10. As illustrated in FIG. 2, acoustic air data system 10 further includes control circuitry 16. Control circuitry 16 includes timing control 18, analog-to-digital converters (ADC) 20A-20N, time delay estimator circuitry 22A-22N, circle fit circuitry 24, fault detection and isolation logic 26, and air data estimator circuitry 28. (It should be understood that the reference "N" represents an arbitrary number, such that acoustic air data system 10 can include any number of analog-to-digital converters 20A-20N or time delay estimator circuitry 22A-22N.)

While the example of FIG. 2 illustrates and describes control circuitry 16 as including various circuit components, it should be understood that in some examples, control circuitry 16 and/or any one or more components of control circuitry 16 can be implemented in hardware, software, or combinations of hardware and software. For instance, control circuitry 16 can take the form of and/or include one or more processors and computer-readable memory encoded with instructions that, when executed by the one or more processors, cause acoustic air data sensing system 10 to operate in accordance with techniques described herein.

Examples of the one or more processors can include any one or more of a microprocessor, a digital signal processor (DSP), an application specific integrated circuit (ASIC), a field-programmable gate array (FPGA), or other equivalent discrete or integrated logic circuitry. Computer-readable memory of control circuitry 16 can be configured to store information within control circuitry 16 during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of control circuitry 16 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable (EEPROM) memories.

As illustrated in FIG. 2, timing control 18 provides first pulse command electrical control signal (i.e., "ping") 19A to first acoustic transmitter $T_1$ representing a waveform of the first acoustic signal to be transmitted by first acoustic transmitter $T_1$. Timing control 18 similarly provides second pulse command electrical control signal (i.e., "pong") 19B to second acoustic transmitter $T_2$ representing a waveform of the second acoustic signal to be transmitted by second acoustic transmitter $T_2$. The waveform can take the form of an acoustic pulse, an oscillating acoustic signal, a broadband acoustic signal, a random source acoustic signal, or other form of acoustic signal.

For example, first pulse command 19A and second pulse command 19B can be provided in an alternating manner, such that only one of first and second pulse command 19A-19B is transmitted at a particular time (e.g., first and second acoustic transmitters $T_1$-$T_2$ can operate in an alternating or "ping-pong" manner). Alternative embodiments can include first pulse command 19A with a waveform at a first frequency and second pulse command 19B with a waveform at a second frequency, such that first and second pulse command 19A-19B can be sent simultaneously (e.g., first and second acoustic transmitters $T_1$-$T_2$ can operate in a continuous manner). Timing control 18 also provides electrical control signal 21 representing the waveforms of the first and second acoustic signal to be transmitted as a zone-of-interest enablement to analog-to-digital converters 20A-20N, electrical control signal 23 representing the waveforms of the first and second acoustic signal to be transmitted as a reference signal for frequency selection to time delay estimators 22A-22N, and electrical control signal 25 representing the waveforms of the first and second acoustic signal to be transmitted as a reference signal for fault detection and isolation logic 26.

First acoustic transmitter $T_1$, in response to receiving first pulse command 19A from timing control 18, transmits the first acoustic signal into the airflow about the aircraft exterior. The acoustic signal propagates through the airflow about the aircraft exterior and is received by each of acoustic receivers $R_1$-$R_6$, as is schematically illustrated by radial lines $r_1$-$r_3$ in the example of FIG. 2. Second acoustic transmitter $T_2$, in response to receiving second pulse command 19B from timing control 18, transmits the second acoustic signal into the airflow about the aircraft exterior. The acoustic signal propagates through the airflow about the aircraft exterior and is received by each of acoustic receivers $R_1$-$R_6$, as is schematically illustrated by radial lines $r_4$-$r_6$ in the example of FIG. 2.

Acoustic receivers $R_1$-$R_6$ receive the first and second acoustic signal at varying times. Each of acoustic receivers $R_1$-$R_6$ provides an electrical signal through a corresponding one of analog-to-digital converters 20A-20N to two corresponding ones of time delay estimator circuitry 22A-22N, the electrical signal representing the waveform of the received acoustic signal. Specifically, the electrical signal provided by each of acoustic receivers $R_1$-$R_6$ is sent to one of time delay estimator circuitry 22A-22N that corresponds to the first set of radial lines (i.e., radial lines $r_1$-$r_3$ and radially paired acoustic receivers $R_1$ and $R_2$, $R_3$ and $R_4$, and $R_5$ and $R_6$) and one of time delay estimator circuitry 22A-22N that corresponds to the second set of radial lines (i.e., radial lines $r_4$-$r_6$ and radially paired acoustic receivers $R_5$ and $R_1$, $R_3$ and $R_2$, and $R_6$ and $R_4$). For instance, in the example of FIG. 2, acoustic receiver $R_1$ provides an electrical signal to time delay estimators 22C and 22N, acoustic receiver $R_2$ provides an electrical signal to time delay estimators 22B and 22N, acoustic receiver $R_3$ provides an electrical signal to time delay estimators 22B and 22E, acoustic receiver $R_4$ provides an electrical signal to time delay estimators 22A and 22E, acoustic receiver $R_5$ provides an electrical signal to time delay estimators 22C and 22D, and acoustic receiver $R_6$ provides an electrical signal to time delay estimators 22A and 22D.

Each of time delay estimator circuitry 22A-22N determines the time difference of arrival (TDOA) representing the difference in the time of flight of the first acoustic signal emitted by first acoustic transmitter $T_1$ and of the second acoustic signal emitted by second acoustic transmitter $T_2$ to the respective ones of acoustic receivers $R_1$-$R_6$, and outputs the respective TDOA to circle fit circuitry 24. For instance, as illustrated in FIG. 2, time delay estimator circuitry 22A outputs TDOA $\Delta\tau_6$ to circle fit circuitry 24, TDOA $\Delta\tau_6$ representing the difference in the time of flight of the second acoustic signal between acoustic receiver $R_6$ (i.e., the relatively closer one of the radially paired acoustic receivers) and acoustic receiver $R_4$ (i.e., the relatively further one of the radially paired acoustic receivers). Time delay estimator circuitry 22B outputs TDOA $\Delta\tau_5$ to circle fit circuitry 24, TDOA $\Delta\tau_5$ representing the difference in the time of flight of the second acoustic signal between acoustic receiver $R_3$ and acoustic receiver $R_2$. Time delay estimator circuitry 22C outputs TDOA $\Delta\tau_4$ to circle fit circuitry 24, TDOA $\Delta\tau_4$ representing the difference in the time of flight of the second acoustic signal between acoustic receiver $R_5$ and acoustic receiver $R_1$. Time delay estimator circuitry 22D outputs TDOA $\Delta\tau_3$ to circle fit circuitry 24, TDOA $\Delta\tau_3$ representing the difference in the time of flight of the first acoustic signal between acoustic receiver $R_5$ and acoustic receiver $R_6$. Time delay estimator circuitry 22E outputs TDOA $\Delta\tau_2$ to circle fit circuitry 24, TDOA $\Delta\tau_2$ representing the difference in the time of flight of the first acoustic signal between acoustic receiver $R_3$ and acoustic receiver $R_4$. Time delay estimator circuitry 22N outputs TDOA $\Delta\tau_1$ to circle fit circuitry 24, TDOA $\Delta\tau_1$ representing the difference in the time of flight of the first acoustic signal between acoustic receiver $R_1$ and acoustic receiver $R_2$.

There are many known methods of estimating TDOA, including, for example, spectral cross-correlation for pulsed signals. Time delay estimator circuitry 22A-22N can also filter the electrical signals received from acoustic receivers $R_1$-$R_6$ based on an expected frequency content of the transmitted signal as provided by electrical control signal 23 from timing control 18.

As illustrated in FIG. 2, circle fit circuitry 24 receives TDOA $\Delta\tau_1$-$\Delta\tau_6$ from time delay estimator circuitry 22A-22N. Circle fit circuitry 24 determines signal velocities of the first acoustic signal for each corresponding radially paired acoustic receiver (i.e., between acoustic receivers $R_1$ and $R_2$, $R_3$ and $R_4$, and $R_5$ and $R_6$) based on the respective TDOA $\Delta\tau_1$-$\Delta\tau_3$ and the corresponding known distances $d_1$-$d_3$ (FIG. 1) between radially paired acoustic receivers $R_1$ and $R_2$, $R_3$ and $R_4$, and $R_5$ and $R_6$, respectively. Circle fit circuitry 24 determines signal velocities of the second acoustic signal for each corresponding radially paired acoustic receiver (i.e., between acoustic receivers $R_5$ and $R_1$, $R_3$ and $R_2$, and $R_6$ and $R_4$) based on the respective TDOA $\Delta\tau_4$-$\Delta\tau_6$ and the corresponding known distances $d_4$-$d_6$ (FIG. 1) between radially paired acoustic receivers $R_5$ and $R_1$, $R_3$ and $R_2$, and $R_6$ and $R_4$, respectively.

For instance, circle fit circuitry 24 can divide the respective distances $d_1$-$d_6$ by the respective TDOA $\Delta\tau_1$-$\Delta\tau_6$ to determine signal velocities. For instance, circle fit circuitry 24 can divide distance $d_1$ by time of flight $\Delta\tau_1$ to determine the signal velocity of the first acoustic signal between relatively inner acoustic receiver $R_1$ and relatively outer acoustic receiver $R_2$. Circle fit circuitry 24 can divide distance $d_2$ by time of flight $\Delta\tau_2$ to determine the signal velocity of the first acoustic signal between relatively inner acoustic receiver $R_3$ and relatively outer acoustic receiver $R_4$. Circle fit circuitry 24 can divide distance $d_3$ by time of flight $\Delta\tau_3$ to determine the signal velocity of the first acoustic signal between relatively inner acoustic receiver $R_5$ and relatively outer acoustic receiver $R_6$. Circle fit circuitry 24 can divide distance $d_4$ by time of flight $\Delta\tau_4$ to determine the signal velocity of the second acoustic signal between relatively inner acoustic receiver $R_5$ and relatively outer acoustic receiver $R_1$. Circle fit circuitry 24 can divide distance $d_5$ by time of flight $\Delta\tau_5$ to determine the signal velocity of the second acoustic signal between relatively inner acoustic receiver $R_3$ and relatively outer acoustic receiver $R_2$. Circle fit circuitry 24 can divide distance $d_6$ by time of flight $\Delta\tau_6$ to determine the signal velocity of the second acoustic signal between relatively inner acoustic receiver $R_6$ and relatively outer acoustic receiver $R_4$. Thus, in the example of FIG. 2, circle fit circuitry can calculate six separate signal velocity measurements.

For instance, signal velocity of an acoustic signal as measured between co-linear acoustic receivers can be expressed according to the following equation:

$$V_{\theta_n} = \frac{d_n}{\Delta \tau_n} = \sqrt{C_o^2 - V^2 \sin^2(\theta_n - \alpha)} + V\cos(\theta_n - \alpha) \quad \text{(Equation 1)}$$

where $V_{\theta_n}$ is the measured signal velocity of the nth respective radial pair of acoustic receivers, $d_n$ is the distance between the relatively inner and relatively outer ones of the nth respective radial pair of acoustic receivers, $\Delta\tau_n$ is the corresponding respective TDOA of the acoustic signal of the nth respective radial pair of acoustic receivers, $\theta_n$ is the respective angle between first wind angle reference line 12 (for radially paired acoustic receivers $R_1$ and $R_2$, $R_3$ and $R_4$, and $R_5$ and $R_6$) or second wind angle reference line 14 (for radially paired acoustic receivers $R_5$ and $R_1$, $R_3$ and $R_2$, and $R_6$ and $R_4$) and the nth respective radial pair of acoustic receivers, $C_o$ is the speed of sound of the airflow about the exterior of the vehicle, V is the true airspeed of the airflow about the exterior of the vehicle, and a is the wind angle of the airflow about the exterior of the vehicle. It should be understood that "n" represents an arbitrary number, which, in the example of FIG. 2, can correspond to any one of radial lines $r_1$-$r_6$ (and, therefore, any one of the corresponding radial pairs of acoustic receivers).

Circle fit circuitry 24 can also convert each signal velocity to a polar form on a representative x-y coordinate plane based on association with the respective known angles of the first set of radially paired acoustic receivers from first wind angle reference line 12 and of the second set of radially paired acoustic receivers from second wind angle reference line 14. Circle fit circuitry 24 can fit signal velocity measurements to a circle according to known algorithms, such as a least-squares fit. A circle estimated by circle fit circuitry 24 can have circle parameters including center coordinates ($c_x$, $c_y$) and a radius $C_r$ with respect to a representative x-y coordinate plane. Circle fit circuitry 24 can provide the circle parameters to fault detection and isolation logic 26.

Fault detection and isolation logic 26 can estimate a first circle based on the signal velocities measured from the first set of radially paired acoustic receivers (i.e., from radially paired acoustic receivers $R_1$ and $R_2$, $R_3$ and $R_4$, and $R_5$ and $R_6$) and a second circle based on the signal velocities measured from the second set of radially paired acoustic receivers (i.e., from radially paired acoustic receivers $R_5$ and $R_1$, $R_3$ and $R_2$, and $R_6$ and $R_4$). If the radii of the first and second circles differ by a predetermined threshold, fault detection and isolation logic 26 can detect a fault, indicating that at least one of acoustic receivers $R_1$-$R_6$ is corrupted (e.g., the acoustic signal was not received or is otherwise unsuitable for use with the air data parameter output computations).

If a fault is not detected, fault detection and isolation logic 26 can estimate a best-fit circle by fitting all signal velocity measurements (i.e., from the first and second set of radially paired acoustic receivers) to a circle according to known algorithms, such as a least-squares fit. If a fault is detected, fault detection and isolation logic 26, in the example of FIG. 2, can estimate separate circles using every possible combination of three signal velocity measurements. Two of the estimated circles can be outliers to the rest based on a predetermined threshold, indicating a single corrupted one of the acoustic receivers $R_1$-$R_6$ that is shared by the two outlier circle estimates. Fault detection and isolation logic 26 can ignore the signal velocity measurements corresponding to the corrupted one of the acoustic receivers $R_1$-$R_6$. Fault detection and isolation logic 26 provides channel selection electrical signal 27 to circle fit circuitry 24 to indicate the usable (i.e., non-corrupted) selection of signal velocity measurements. Fault detection and isolation logic 26 then estimates an optimal fit circle using the remaining viable signal velocity measurements. The best fit circle or, alternatively, the optimal fit circle estimated by fault detection and isolation logic 26 can have center coordinates ($c_{xo}$, $c_{yo}$) and a radius $c_{ro}$ on a representative x-y coordinate plane. Fault detection and isolation logic 26 can provide the best fit circle or the optimal fit circle parameters to air data estimator circuitry 28.

Air data estimator circuitry 28 determines air data parameters (e.g., relative wind angle, speed of sound, Mach number, and true airspeed) based on the parameters of the best fit circle or the optimal fit circle. Air data estimator circuitry 28 determines relative wind angle $\alpha$, which can correspond to an angle of attack or angle of sideslip of the aircraft. Air data estimator circuitry 28 can determine relative wind angle $\alpha$ according to the following equation:

$$\alpha = \tan^{-1}\left(\frac{-c_{yo}}{-c_{xo}}\right) \quad \text{(Equation 2)}$$

Air data estimator circuitry 28 can determine speed of sound $C_o$ about the exterior of the aircraft according to the following equation:

$$C_o = c_{ro} \quad \text{(Equation 3)}$$

Air data estimator circuitry 28 can determine Mach number M of the airflow about the exterior of the aircraft according to the following equation:

$$M = \sqrt{\frac{c_{xo}^2 + c_{yo}^2}{c_{ro}}} \quad \text{(Equation 4)}$$

Air data estimator circuitry 28 can determine true airspeed V of the airflow about the exterior of the aircraft according to the following equation:

$$V = C_o M \quad \text{(Equation 5)}$$

Control circuitry 16, as illustrated in FIG. 2, outputs relative wind angle $\alpha$, speed of sound $C_o$, Mach number M, and true airspeed V to one or more consuming systems, such as an aircraft flight management system (FMS), autoflight control system (AFCS), electronic flight instrument system (EFIS), or other consuming systems for operational control of the aircraft.

Accordingly, acoustic air data sensing system 10, implementing techniques described herein, can determine aircraft air data parameters, such as angle of attack and/or angle of sideslip, Mach number, and true airspeed of the airflow, based on propagation of emitted acoustic signals from two acoustic transmitters $T_1$ and $T_2$ that are received at radially paired acoustic receivers $R_1$-$R_6$. Acoustic air data system 10, implementing techniques described herein, can combine information from all non-faulted acoustic receivers to provide optimal best fit air data parameter estimates. The configuration of acoustic air data system 10 with radially paired acoustic receivers $R_1$-$R_6$ allows for a time difference of arrival (TDOA) to be utilized in calculating air data parameters, rather than a time of arrival (TOA). Using TDOA between radially paired acoustic receivers removes the "group delay" (i.e., the internal delay period of a signal within an electrical device) of the acoustic transmitters and neutralizes the "group delay" of the acoustic receivers. The use of dual acoustic transmitters in acoustic air data system 10 provides higher reliability by reducing both total on-time and switching frequency for a single acoustic transmitter. Alternatively, acoustic air data system 10 implementing dual-frequency acoustic transmitters as described herein provides a more robust solution to a wide range of acoustic environments and potential for predictive health on the acoustic transmitters.

For ease of discussion, FIGS. 3A-3C illustrating further embodiments of acoustic air data systems will be described together. FIG. 3A is a top-down view of acoustic air data system 100. Acoustic air data system 100 including first acoustic transmitter Tim and second acoustic transmitter $T_{102}$ is substantially similar to acoustic air data system 10 and additionally includes acoustic receivers $R_{101}$-$R_{114}$.

As illustrated in FIG. 3A, acoustic receivers $R_{101}$-$R_{114}$ are located along lines extending radially from first acoustic transmitter $T_{101}$ and second acoustic transmitter $T_{102}$. Specifically, pairs of acoustic receivers $R_{105}$-$R_{110}$ are co-located (i.e., radially paired) along lines extending radially from first acoustic transmitter Tim, and different pairs of acoustic receivers $R_{105}$-$R_{110}$ are co-located along lines extending radially from second acoustic transmitter $T_{102}$. In the example of FIG. 3A, pairs of acoustic receivers $R_{105}$ and $R_{106}$, $R_{107}$ and $R_{108}$, and $R_{109}$ and $R_{110}$ are located along lines extending radially from first acoustic transmitter $T_{101}$, and pairs of acoustic receivers $R_{109}$ and $R_{105}$, $R_{107}$ and $R_{106}$, and $R_{110}$ and $R_{108}$ are located along lines extending radially from second acoustic transmitter $T_{102}$. Pairs of acoustic receivers $R_{101}$-$R_{104}$ are only located along lines extending radially from first acoustic transmitter $T_{101}$, and pairs of acoustic receivers $R_{111}$-$R_{114}$ are only located along lines extending radially from second acoustic transmitter $T_{102}$.

As is further illustrated in FIG. 3A, acoustic receivers $R_{101}$ and $R_{102}$ are located along radial line $r_{101}$ extending from first acoustic transmitter $T_{101}$, such that acoustic receiver $R_{102}$ is located at a radial distance equal to $r_{101}$ from first acoustic transmitter $T_{101}$. Acoustic receiver $R_{101}$ is relatively closer (i.e., relatively inner) to first acoustic transmitter $T_{101}$, and acoustic receiver $R_{102}$ is relatively further (i.e., relatively outer) from first acoustic transmitter $T_{101}$. Acoustic receivers $R_{103}$ and $R_{104}$ are located along radial line $r_{102}$ extending from first acoustic transmitter $T_{101}$, such that acoustic receiver $R_{104}$ is located at a radial distance equal to $r_{102}$ from first acoustic transmitter $T_{101}$. Acoustic receiver $R_{103}$ is relatively closer to first acoustic transmitter $T_{101}$, and acoustic receiver $R_{104}$ is relatively further from first acoustic transmitter $T_{101}$. Acoustic receivers $R_{105}$ and $R_{106}$ are located along radial line $r_{103}$ extending from first acoustic transmitter $T_{101}$, such that acoustic receiver $R_{106}$ is located at a radial distance equal to $r_{103}$ from first acoustic transmitter $T_{101}$. Acoustic receiver $R_{105}$ is relatively closer to first acoustic transmitter $T_{101}$, and acoustic receiver $R_{106}$ is relatively further from first acoustic transmitter $T_{101}$. Acoustic receivers $R_{107}$ and $R_{108}$ are located along radial line $r_{104}$ extending from first acoustic transmitter $T_{101}$, such that acoustic receiver $R_{108}$ is located at a radial distance equal to $r_{104}$ from first acoustic transmitter $T_{101}$. Acoustic receiver $R_{107}$ is relatively closer to first acoustic transmitter $T_{101}$, and acoustic receiver $R_{108}$ is relatively further from first acoustic transmitter $T_{101}$. Acoustic receivers $R_{109}$ and $R_{110}$ are located along radial line $r_{105}$ extending from first acoustic transmitter $T_{101}$, such that acoustic receiver $R_{110}$ is located at a radial distance equal to $r_{105}$ from first acoustic transmitter $T_{101}$. Acoustic receiver $R_{109}$ is relatively closer to first acoustic transmitter $T_{101}$, and acoustic receiver $R_{110}$ is relatively further from first acoustic transmitter $T_{101}$. Thus, a first set of radial lines (i.e., radial lines $r_{103}$-$r_{105}$) corresponds to first acoustic transmitter $T_{101}$ and a first set of radially paired and overlapping acoustic receivers. Acoustic receivers $R_{101}$, $R_{103}$, $R_{105}$, $R_{107}$, and $R_{109}$ are radially inner along radial lines $r_{101}$-$r_{105}$, respectively, with respect to first acoustic transmitter $T_{101}$. Acoustic receivers $R_{102}$, $R_{104}$, $R_{106}$, $R_{108}$, and $R_{110}$ are radially outer along radial lines $r_{101}$-$r_{105}$, respectively, with respect to first acoustic transmitter $T_{101}$.

Similarly, acoustic receivers $R_{109}$ and $R_{105}$ are located along radial line $r_{106}$ extending from second acoustic transmitter $T_{102}$, such that acoustic receiver $R_{105}$ is located at a radial distance equal to $r_{106}$ from second acoustic transmitter $T_{102}$. Acoustic receiver $R_{109}$ is relatively closer (i.e., relatively inner) to second acoustic transmitter $T_{102}$, and acoustic receiver $R_{105}$ is relatively further (i.e., relatively outer) from second acoustic transmitter $T_{102}$. Acoustic receivers $R_{107}$ and $R_{106}$ are located along radial line $r_{107}$ extending from second acoustic transmitter $T_{102}$, such that acoustic receiver $R_{106}$ is located at a radial distance equal to $r_{107}$ from second acoustic transmitter $T_{102}$. Acoustic receiver $R_{107}$ is relatively closer to second acoustic transmitter $T_{102}$, and acoustic receiver $R_{106}$ is relatively further from second acoustic transmitter $T_{102}$. Acoustic receivers $R_{110}$ and $R_{108}$ are located along radial line $r_{108}$ extending from second acoustic transmitter $T_{102}$, such that acoustic receiver $R_{108}$ is located at a radial distance equal to $r_{108}$ from second acoustic transmitter $T_{102}$. Acoustic receiver $R_{110}$ is relatively closer to second acoustic transmitter $T_{102}$, and acoustic receiver $R_{108}$ is relatively further from second acoustic transmitter $T_{102}$. Acoustic receivers $R_{111}$ and $R_{112}$ are located along radial line $r_{109}$ extending from second acoustic transmitter $T_{102}$, such that acoustic receiver $R_{112}$ is located at a radial distance equal to $r_{109}$ from second acoustic transmitter $T_{102}$. Acoustic receiver $R_{111}$ is relatively closer to second acoustic transmitter $T_{102}$, and acoustic receiver $R_{112}$ is relatively further from second acoustic transmitter $T_{102}$. Acoustic receivers $R_{113}$ and $R_{114}$ are located along radial line rib extending from second acoustic transmitter $T_{102}$, such that acoustic receiver $R_{114}$ is located at a radial distance equal to $r_{110}$ from second acoustic transmitter $T_{102}$. Acoustic receiver $R_{113}$ is relatively closer to second acoustic transmitter $T_{102}$, and acoustic receiver $R_{114}$ is relatively further from second acoustic transmitter $T_{102}$. Thus, a second set of radial lines (i.e., radial lines $r_{106}$-$r_{108}$) corresponds to second acoustic transmitter $T_{102}$ and a second set of radially paired and overlapping acoustic receivers. Acoustic receivers $R_{109}$, $R_{107}$, $R_{110}$, $R_{111}$, and $R_{113}$ are radially inner along radial lines $r_{106}$-$r_{110}$, respectively, with respect to second acoustic transmitter $T_{102}$. Acoustic receivers $R_{105}$, $R_{106}$, $R_{108}$, $R_{112}$, and $R_{114}$ are radially outer along radial lines $r_{106}$-$r_{110}$, respectively, with respect to second acoustic transmitter $T_{102}$.

In the example of FIG. 3A, groups of acoustic receivers $R_{101}$-$R_{106}$, acoustic receivers $R_{105}$-$R_{110}$, and acoustic receivers $R_{108}$ and $R_{110}$-$R_{114}$ each form arrays such that one of acoustic receivers of each array is located at each of a center and vertices of a regular pentagon.

FIG. 3B is a top-down view of acoustic air data system 200 illustrating irregular geometry. Acoustic air data system 200 including first acoustic transmitter $T_{201}$ and second acoustic transmitter $T_{202}$ is substantially similar to acoustic air data system 10 and additionally includes acoustic receivers $R_{201}$-$R_{206}$.

As illustrated in FIG. 3B, each of acoustic receivers $R_{201}$-$R_{206}$ are located along lines extending radially from first acoustic transmitter $T_{201}$ and second acoustic transmitter $T_{202}$. That is, pairs of acoustic receivers $R_{201}$-$R_{206}$ are co-located (i.e., radially paired) along lines extending radially from first acoustic transmitter $T_{201}$, and different pairs of acoustic receivers $R_{201}$-$R_{206}$ are co-located along lines extending radially from second acoustic transmitter $T_{202}$. In the example of FIG. 3B, pairs of acoustic receivers $R_{201}$ and $R_{202}$, $R_{203}$ and $R_{204}$, and $R_{205}$ and $R_{206}$ are located along lines extending radially from first acoustic transmitter $T_{201}$, and pairs of acoustic receivers $R_{205}$ and $R_{201}$, $R_{203}$ and $R_{202}$, and $R_{206}$ and $R_{204}$ are located along lines extending radially from second acoustic transmitter $T_{202}$.

As is further illustrated in FIG. 3B, acoustic receivers $R_{201}$ and $R_{202}$ are located along radial line $r_{201}$ extending from first acoustic transmitter $T_{201}$, such that acoustic receiver $R_{202}$ is located at a radial distance equal to $r_{201}$ from first acoustic transmitter $T_{201}$. Acoustic receiver $R_{201}$ is relatively closer (i.e., relatively inner) to first acoustic transmitter $T_{201}$, and acoustic receiver $R_{202}$ is relatively further (i.e., relatively outer) from first acoustic transmitter $T_{201}$. Acoustic receivers $R_{203}$ and $R_{204}$ are located along radial line $r_{202}$ extending from first acoustic transmitter $T_{201}$, such that acoustic receiver $R_{204}$ is located at a radial distance equal to $r_{202}$ from first acoustic transmitter $T_{201}$. Acoustic receiver $R_{203}$ is relatively closer to first acoustic transmitter $T_{201}$, and acoustic receiver $R_{204}$ is relatively further from first acoustic transmitter $T_{201}$. Acoustic receivers $R_{205}$ and $R_{206}$ are located along radial line $r_{203}$ extending from first acoustic transmitter $T_{201}$, such that acoustic receiver $R_{206}$ is located at a radial distance equal to $r_{203}$ from first acoustic transmitter $T_{201}$. Acoustic receiver $R_{205}$ is relatively closer to first acoustic transmitter $T_{201}$, and acoustic receiver $R_{206}$ is relatively further from first acoustic transmitter $T_{201}$. Thus, a first set of radial lines (i.e., radial lines $r_{201}$-$r_{203}$) corresponds to first acoustic transmitter $T_{201}$ and a first set of radially paired acoustic receivers. Acoustic receivers $R_{201}$, $R_{203}$, and $R_{205}$ are radially inner along radial lines $r_{201}$-$r_{203}$, respectively, with respect to first acoustic transmitter $T_{201}$. Acoustic receivers $R_{202}$, $R_{204}$, and $R_{206}$ are radially outer along radial lines $r_{201}$-$r_{203}$, respectively, with respect to first acoustic transmitter $T_{201}$.

Similarly, acoustic receivers $R_{205}$ and $R_{201}$ are located along radial line $r_{204}$ extending from second acoustic transmitter $T_{202}$, such that acoustic receiver $R_{201}$ is located at a radial distance equal to $r_{204}$ from second acoustic transmitter $T_{202}$. Acoustic receiver $R_{205}$ is relatively closer to second acoustic transmitter $T_{202}$, and acoustic receiver $R_{201}$ is relatively further from second acoustic transmitter $T_{202}$. Acoustic receivers $R_{203}$ and $R_{202}$ are located along radial line $r_{205}$ extending from second acoustic transmitter $T_{202}$, such that acoustic receiver $R_{202}$ is located at a radial distance equal to $r_{205}$ from second acoustic transmitter $T_{202}$. Acoustic receiver $R_{203}$ is relatively closer to second acoustic transmitter $T_{202}$, and acoustic receiver $R_{202}$ is relatively further from second acoustic transmitter $T_{202}$. Acoustic receivers $R_{206}$ and $R_{204}$ are located along radial line $r_{206}$ extending from second acoustic transmitter $T_{202}$, such that acoustic receiver $R_{204}$ is located at a radial distance equal to $r_{206}$ from second acoustic transmitter $T_{202}$. Acoustic receiver $R_{206}$ is relatively closer to second acoustic transmitter $T_{202}$, and acoustic receiver $R_{204}$ is relatively further from second acoustic transmitter $T_{202}$. Thus, a second set of radial lines (i.e., radial lines $r_{204}$-$r_{206}$) corresponds to second acoustic transmitter $T_{202}$ and a second set of radially paired acoustic receivers. Acoustic receivers $R_{205}$, $R_{203}$, and $R_{206}$ are radially inner along radial lines $r_{204}$-$r_{206}$, respectively, with respect to second acoustic transmitter $T_{202}$. Acoustic receivers $R_{201}$, $R_{202}$, and $R_{204}$ are radially outer along radial lines $r_{204}$-$r_{206}$, respectively, with respect to second acoustic transmitter $T_{202}$.

In the example of FIG. 3B, acoustic receivers $R_{201}$-$R_{206}$ form an array such that one of acoustic receivers $R_{201}$-$R_{206}$ is located at each of a center and vertices of an irregular pentagon.

FIG. 3C is a top-down view of acoustic air data system 300 illustrating linear arrays. Acoustic air data system 300 including first acoustic transmitter $T_{301}$ and second acoustic transmitter $T_{302}$ is substantially similar to acoustic air data system 10 and additionally includes acoustic receivers $R_{301}$-$R_{311}$.

As illustrated in FIG. 3C, acoustic receivers $R_{301}$-$R_{311}$ are located along lines extending radially from first acoustic transmitter $T_{301}$ and second acoustic transmitter $T_{302}$. Specifically, pairs of acoustic receivers $R_{302}$-$R_{310}$ are co-located (i.e., radially paired) along lines extending radially from first acoustic transmitter $T_{301}$, and different pairs of acoustic receivers $R_{302}$-$R_{310}$ are co-located along lines extending radially from second acoustic transmitter $T_{302}$. In the example of FIG. 3C, pairs of acoustic receivers $R_{302}$ and $R_{303}$, $R_{304}$ and $R_{305}$, $R_{306}$ and $R_{307}$, $R_{308}$ and $R_{309}$, and $R_{310}$ and $R_{311}$ are located along lines extending radially from first acoustic transmitter $T_{301}$, and pairs of acoustic receivers $R_{302}$ and $R_{301}$, $R_{304}$ and $R_{303}$, $R_{306}$ and $R_{305}$, $R_{308}$ and $R_{307}$, and $R_{310}$ and $R_{309}$ are located along lines extending radially from second acoustic transmitter $T_{302}$. Individual acoustic receivers $R_{301}$ and $R_{311}$ are only located along lines extending radially from second acoustic transmitter $T_{302}$ and first acoustic transmitter $T_{301}$, respectively.

As is further illustrated in FIG. 3C, acoustic receivers $R_{302}$ and $R_{303}$ are located along radial line $r_{301}$ extending from first acoustic transmitter $T_{301}$, such that acoustic receiver $R_{303}$ is located at a radial distance equal to $r_{301}$ from first acoustic transmitter $T_{301}$. Acoustic receiver $R_{302}$ is relatively closer (i.e., relatively inner) to first acoustic transmitter $T_{301}$, and acoustic receiver $R_{303}$ is relatively further (i.e., relatively outer) from first acoustic transmitter $T_{301}$. Acoustic receivers $R_{304}$ and $R_{305}$ are located along radial line $r_{302}$ extending from first acoustic transmitter $T_{301}$, such that acoustic receiver $R_{305}$ is located at a radial distance equal to $r_{302}$ from first acoustic transmitter $T_{301}$. Acoustic receiver $R_{304}$ is relatively closer to first acoustic transmitter $T_{301}$, and acoustic receiver $R_{305}$ is relatively further from first acoustic transmitter $T_{301}$. Acoustic receivers $R_{306}$ and $R_{307}$ are located along radial line $r_{303}$ extending from first acoustic transmitter $T_{301}$, such that acoustic receiver $R_{307}$ is located at a radial distance equal to $r_{303}$ from first acoustic transmitter $T_{301}$. Acoustic receiver $R_{306}$ is relatively closer to first acoustic transmitter $T_{301}$, and acoustic receiver $R_{307}$ is relatively further from first acoustic transmitter $T_{301}$. Acoustic receivers $R_{308}$ and $R_{309}$ are located along radial line $r_{304}$ extending from first acoustic transmitter $T_{301}$, such that acoustic receiver $R_{309}$ is located at a radial distance equal to $r_{304}$ from first acoustic transmitter $T_{301}$. Acoustic receiver $R_{308}$ is relatively closer to first acoustic transmitter $T_{301}$, and acoustic receiver $R_{309}$ is relatively further from first acoustic transmitter $T_{301}$. Acoustic receivers $R_{310}$ and $R_{311}$ are located along radial line $r_{305}$ extending from first acoustic transmitter $T_{301}$, such that acoustic receiver $R_{311}$ is located at a radial distance equal to $r_{305}$ from first acoustic transmitter $T_{301}$. Acoustic receiver $R_{310}$ is relatively closer to first acoustic transmitter $T_{301}$, and acoustic receiver $R_{311}$ is relatively further from first acoustic transmitter $T_{301}$. Thus, acoustic receivers $R_{302}$, $R_{304}$, $R_{306}$, $R_{308}$, and $R_{310}$ are radially inner along radial lines $r_{301}$-$r_{305}$, respectively, with respect to first acoustic transmitter $T_{301}$. Acoustic receivers $R_{303}$, $R_{305}$, $R_{307}$, $R_{309}$, and $R_{311}$ are radially outer along radial lines $r_{301}$-$r_{305}$, respectively, with respect to first acoustic transmitter $T_{301}$.

Similarly, acoustic receivers $R_{302}$ and $R_{301}$ are located along radial line $r_{306}$ extending from second acoustic transmitter $T_{302}$, such that acoustic receiver $R_{301}$ is located at a radial distance equal to $r_{306}$ from second acoustic transmitter $T_{302}$. Acoustic receiver $R_{302}$ is relatively closer (i.e., relatively inner) to second acoustic transmitter $T_{302}$, and acoustic receiver $R_{301}$ is relatively further (i.e., relatively outer) from second acoustic transmitter $T_{302}$. Acoustic receivers $R_{304}$ and $R_{303}$ are located along radial line $r_{307}$ extending from second acoustic transmitter $T_{302}$, such that acoustic receiver $R_{303}$ is located at a radial distance equal to $r_{307}$ from second acoustic transmitter $T_{302}$. Acoustic receiver $R_{304}$ is relatively closer to second acoustic transmitter $T_{302}$, and acoustic receiver $R_{303}$ is relatively further from second acoustic transmitter $T_{302}$. Acoustic receivers $R_{306}$ and $R_{305}$ are located along radial line $r_{308}$ extending from second acoustic transmitter $T_{302}$, such that acoustic receiver $R_{305}$ is located at a radial distance equal to $r_{308}$ from second acoustic transmitter $T_{302}$. Acoustic receiver $R_{306}$ is relatively closer to second acoustic transmitter $T_{302}$, and acoustic receiver $R_{305}$ is relatively further from second acoustic transmitter $T_{302}$. Acoustic receivers $R_{308}$ and $R_{307}$ are located along radial line $r_{309}$ extending from second acoustic transmitter $T_{302}$, such that acoustic receiver $R_{307}$ is located at a radial distance equal to $r_{309}$ from second acoustic transmitter $T_{302}$. Acoustic receiver $R_{308}$ is relatively closer to second acoustic transmitter $T_{302}$, and acoustic receiver $R_{307}$ is relatively further from second acoustic transmitter $T_{302}$. Acoustic receivers $R_{310}$ and $R_{309}$ are located along radial line $r_{310}$ extending from second acoustic transmitter $T_{302}$, such that acoustic receiver $R_{309}$ is located at a radial distance equal to $r_{310}$ from second acoustic transmitter $T_{302}$. Acoustic receiver $R_{310}$ is relatively closer to second acoustic transmitter $T_{302}$, and acoustic receiver $R_{309}$ is relatively further from second acoustic transmitter $T_{302}$. Thus, acoustic receivers $R_{302}$, $R_{304}$, $R_{306}$, $R_{308}$, and $R_{310}$ are radially inner along radial lines $r_{306}$-$r_{310}$, respectively, with respect to second acoustic transmitter $T_{302}$. Acoustic receivers $R_{301}$, $R_{303}$, $R_{305}$, $R_{307}$, and $R_{309}$ are radially outer along radial lines $r_{306}$-$r_{310}$, respectively, with respect to second acoustic transmitter $T_{302}$.

In operation, each of acoustic air data system 100, acoustic air data system 200, and acoustic air data system 300 is functionally substantially similar to acoustic air data system 10 (as described above with respect to FIGS. 1 and 2). For example, acoustic air data systems 100, 200, and 300 further include control circuitry (e.g., control circuitry 16 in FIG. 2) that determines TDOA, measures signal velocity, estimates a best fit circle, and outputs air data parameters (e.g., relative wind angle, speed of sound, Mach number, and true airspeed) for operational control of a vehicle.

Accordingly, acoustic air data systems 100, 200, and 300, implementing techniques of this disclosure, can determine aircraft air data parameters, such as angle of attack and/or angle of sideslip, Mach number, and true airspeed of the airflow, based on propagation of emitted acoustic signals from two acoustic transmitters that are received at an array of radially paired acoustic receivers. The inclusion of additional radially paired acoustic receivers (e.g., as illustrated in FIG. 3A in acoustic air data system 100) provides more sample points at different angles. The additional TDOA estimates from these sample points can improve circle fit estimates, which subsequently improves the air data parameter estimates. Furthermore, using additional sample points allows for the use of other outlier detection methods for acoustic receiver fault detection and isolation (e.g., Random Sample Consensus (RANSAC) algorithms). Acoustic air data systems 200 and 300 (as illustrated in FIGS. 3B and 3C) can measure signal velocity more accurately due to the wider possible separation distances between acoustic receivers. Wider separation distances between acoustic receivers relaxes the sensing resolution requirements of the system. Acoustic air data systems 200 and 300 also include acoustic receivers at different angles (e.g., with wider angular separation between acoustic receiver pairs), which can improve circle fit estimates by reducing the geometric dilution of precision (GDOP). Additionally, acoustic air data system 300, implementing techniques of this disclosure, maximizes the number of radially paired acoustic receivers along a given orientation to efficiently cover a limited space. The techniques of this disclosure can therefore enable accurate acoustic measurements and air data parameter calculations even at relatively high wind velocities, such as velocities above Mach 0.2, thereby enhancing usability of the acoustic air data sensor for providing air data parameters used for controlled flight of the aircraft.

Discussion of Possible Embodiments

The following are non-exclusive descriptions of possible embodiments of the present invention.

An acoustic air data system includes a first acoustic transmitter, a second acoustic transmitter, an array of acoustic receivers, and control circuitry. The first acoustic transmitter is located to transmit a first acoustic signal into airflow about an exterior of a vehicle and is located along a first wind angle reference line. The second acoustic transmitter is located to transmit a second acoustic signal into the airflow about the exterior of the vehicle and is located along a second wind angle reference line. The second wind angle reference line is offset from the first wind angle reference line by an offset angle. The first acoustic transmitter is radially aligned with a first pair of acoustic receivers of the array to define a first radial line, the first acoustic transmitter is radially aligned with a second pair of acoustic receivers of the array to define a second radial line, and the first acoustic transmitter is radially aligned with a third pair of acoustic receivers of the array to define a third radial line. The first, second, and third radial lines form respective first angles with the first wind angle reference line and form a first set of acoustic receiver pairs. The second acoustic transmitter is radially aligned with a fourth pair of acoustic receivers of the array to define a fourth radial line, the second acoustic transmitter is radially aligned with a fifth pair of acoustic receivers of the array to define a fifth radial line, and the second acoustic transmitter is radially aligned with a sixth pair of acoustic receivers of the array to define a sixth radial line. The fourth, fifth, and sixth radial lines form respective second angles with the second wind angle reference line and form a second set of acoustic receiver pairs. Each of the first, second, and third pairs of acoustic receivers includes an inner acoustic receiver that is closer to the first acoustic transmitter and an outer acoustic receiver that is further from the first acoustic transmitter. Each of the fourth, fifth, and sixth pairs of acoustic receivers includes an inner acoustic receiver that is closer to the second acoustic transmitter and an outer acoustic receiver that is further from the second acoustic transmitter. The array is positioned to receive both the first and second acoustic signals. The control circuitry determines, for each of the first and second sets of acoustic receiver pairs, time difference of arrival (TDOA) of the first and second acoustic signals, respectively, from the inner acoustic receiver to the outer acoustic receiver. The control circuitry determines, for each of the first and second sets of acoustic receiver pairs, a signal velocity of the first and second acoustic signals, respectively, based on a distance between the inner acoustic receiver and the outer acoustic receiver and a corresponding TDOA for each pair of acoustic receivers. The control circuitry estimates a best fit circle using a best fit algorithm and a polar form of each of the signal velocities, wherein the best fit circle has a center ($c_x$, $c_y$) and a radius $c_r$ on a representative x-y coordinate plane. The control circuitry estimates one or more of wind angle, speed of sound, Mach number, and true airspeed of the airflow about the exterior of the vehicle based on parameters of the best fit circle, and outputs the one or more of the wind angle, speed of sound, Mach number, and true airspeed for operational control of the vehicle.

The acoustic air data system of the preceding paragraph can optionally include, additionally and/or alternatively, any one or more of the following features, configurations and/or additional components:

The control circuitry can determine the wind angle of the airflow about the exterior of the vehicle based on the parameters of the best fit circle according to the following equation:

$$\alpha = \tan^{-1}\left(\frac{-c_y}{-c_x}\right)$$

where $\alpha$ is the wind angle of the airflow about the exterior of the vehicle, where $c_x$ is an x-coordinate of the center of the best fit circle, and where $c_y$ is a y-coordinate of the center of the best fit circle.

The control circuitry can determine the speed of sound of the airflow about the exterior of the vehicle based on the parameters of the best fit circle according to the following equation:

$$C_o = C_r$$

where $C_o$ is the speed of sound of the airflow about the exterior of the vehicle, and where $C_r$ is the radius of the best fit circle.

The control circuitry can determine the Mach number of the airflow about the exterior of the vehicle based on the parameters of the best fit circle according to the following equation:

$$M = \sqrt{\frac{c_x^2 + c_y^2}{c_r}}$$

where M is the Mach number of the airflow about the exterior of the vehicle, where $c_x$ is the x-coordinate of the center of the best fit circle, where $c_y$ is the y-coordinate of the center of the best fit circle, and where $C_r$ is the radius of the best fit circle.

The control circuitry can determine the true airspeed of the airflow about the exterior of the vehicle based on the parameters of the best fit circle according to the following equation:

$$V = C_o M$$

where V is the true airspeed of the airflow about the exterior of the vehicle, where $C_o$ is the speed of sound of the airflow about the exterior of the vehicle, and where M is the Mach number of the airflow about the exterior of the vehicle.

The control circuitry can estimate a first best fit circle for the first set of acoustic receiver pairs and a second best fit circle for the second set of acoustic receiver pairs.

The control circuitry can detect a fault when a first radius of the first best fit circle and a second radius of the second best fit circle differ by a predetermined threshold and remove outlier estimates corresponding to corrupted ones of the acoustic receivers when the fault is detected.

The acoustic receivers of the array can be positioned at a center and vertices of a regular pentagon such that each of the acoustic receivers of the array defines a point on two different ones of the radial lines.

The first acoustic signal can have a first frequency and the second acoustic signal can have a second frequency.

The array of acoustic receivers can be located downstream of the first and second acoustic transmitters with respect to a direction of the airflow about the exterior of the vehicle.

A method includes transmitting, by a first acoustic transmitter, a first acoustic signal into airflow about an exterior of a vehicle, wherein the first acoustic transmitter is located along a first wind angle reference line. The method further includes transmitting, by a second acoustic transmitter, a second acoustic signal into airflow about an exterior of a vehicle, wherein the second acoustic transmitter is located along a second wind angle reference line. The first and second wind angle reference lines are offset by an offset angle. The method further includes receiving the first and second acoustic signals at an array of acoustic receivers. The first acoustic transmitter is radially aligned with a first pair of acoustic receivers of the array to define a first radial line, the first acoustic transmitter is radially aligned with a second pair of acoustic receivers of the array to define a second radial line, and the first acoustic transmitter is radially aligned with a third pair of acoustic receivers of the array to define a third radial line. The first, second, and third radial lines form respective first angles with the first wind angle reference line and form a first set of acoustic receiver pairs. The second acoustic transmitter is radially aligned with a fourth pair of acoustic receivers of the array to define a fourth radial line, the second acoustic transmitter is radially aligned with a fifth pair of acoustic receivers of the array to define a fifth radial line, and the second acoustic transmitter is radially aligned with a sixth pair of acoustic receivers of the array to define a sixth radial line. The fourth, fifth, and sixth radial lines form respective second angles with the second wind angle reference line and form a second set of acoustic receiver pairs. Each of the first, second, and third pairs of acoustic receivers includes an inner acoustic receiver that is closer to the first acoustic transmitter and an outer acoustic receiver that is further from the first acoustic transmitter. Each of the fourth, fifth, and sixth pairs of acoustic receivers includes an inner acoustic receiver that is closer to the second acoustic transmitter and an outer acoustic receiver that is further from the second acoustic transmitter. The method further includes determining, for each of the first and second sets of acoustic receiver pairs, time difference of arrival (TDOA) of the first and second acoustic signals, respectively, from the inner acoustic receiver to the outer acoustic receiver. The method further includes determining, for each of the first and second sets of acoustic receiver pairs, a signal velocity of the first and second acoustic signals, respectively, based on a distance between the inner acoustic receiver and the outer acoustic receiver and a corresponding TDOA for each pair of acoustic receivers. The method further includes estimating a best fit circle using a best fit algorithm and a polar form of each of the signal velocities, wherein the best fit circle has a center ($c_x$, $c_y$) and a radius $c_r$ on a representative x-y coordinate plane. The method further includes estimating one or more of wind angle, speed of sound, Mach number, and true airspeed of the airflow about the exterior of the vehicle based on parameters of the best fit circle, and outputting the one or more of the wind angle, speed of sound, Mach number, and true airspeed for operational control of the vehicle.

The method of the preceding paragraph can optionally include, additionally and/or alternatively, any one or more of the following features, configurations, operations, and/or additional components:

Determining the wind angle of the airflow about the exterior of the vehicle based on the parameters of the best fit circle can include determining the wind angle according to the following equation:

$$\alpha = \tan^{-1}\left(\frac{-c_y}{-c_x}\right)$$

where $\alpha$ is the wind angle of the airflow about the exterior of the vehicle, where $c_x$ is an x-coordinate of the center of the best fit circle, and where $c_y$ is a y-coordinate of the center of the best fit circle.

Determining the speed of sound of the airflow about the exterior of the vehicle based on the parameters of the best fit circle can include determining the speed of sound according to the following equation:

$$C_o = C_r$$

where $C_o$ is the speed of sound of the airflow about the exterior of the vehicle, and where $c_r$ is the radius of the best fit circle.

Determining the Mach number of the airflow about the exterior of the vehicle based on the parameters of the best fit circle can include determining the Mach number according to the following equation:

$$M = \sqrt{\frac{c_x^2 + c_y^2}{c_r}}$$

where M is the Mach number of the airflow about the exterior of the vehicle, where $c_x$ is the x-coordinate of the center of the best fit circle, where $c_y$ is the y-coordinate of the center of the best fit circle, and where $c_r$ is the radius of the best fit circle.

Determining the true airspeed of the airflow about the exterior of the vehicle based on the parameters of the best fit circle can include determining the true airspeed according to the following equation:

$$V = C_o M$$

where V is the true airspeed of the airflow about the exterior of the vehicle, where $C_o$ is the speed of sound of the airflow about the exterior of the vehicle, and where M is the Mach number of the airflow about the exterior of the vehicle.

Estimating the best fit circle can include estimating a first best fit circle for the first set of acoustic receiver pairs and a second best fit circle for the second set of acoustic receiver pairs.

The method can further include detecting a fault when a first radius of the first best fit circle and a second radius of the second best fit circle differ by a predetermined threshold, and removing outlier estimates corresponding to corrupted ones of the acoustic receivers when the fault is detected.

The acoustic receivers of the array can be positioned at a center and vertices of a regular pentagon such that each of the acoustic receivers of the array defines a point on two different ones of the radial lines.

Transmitting the first acoustic signal can include transmitting the first acoustic signal at a first frequency and transmitting the second acoustic signal can include transmitting the second acoustic signal at a second frequency.

The array of acoustic receivers can be located downstream of the first and second acoustic transmitters with respect to a direction of the airflow about the exterior of the vehicle.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An acoustic air data system comprising:
   a first acoustic transmitter located to transmit a first acoustic signal into airflow about an exterior of a vehicle and located along a first wind angle reference line;
   a second acoustic transmitter located to transmit a second acoustic signal into the airflow about the exterior of the vehicle and located along a second wind angle reference line, the second wind angle reference line offset from the first wind angle reference line by an offset angle;
   an array of acoustic receivers;
      wherein the first acoustic transmitter is radially aligned with a first pair of acoustic receivers of the array to define a first radial line, the first acoustic transmitter is radially aligned with a second pair of acoustic receivers of the array to define a second radial line, and the first acoustic transmitter is radially aligned with a third pair of acoustic receivers of the array to define a third radial line; the first, second, and third radial lines forming respective first angles with the first wind angle reference line and forming a first set of acoustic receiver pairs;
      wherein the second acoustic transmitter is radially aligned with a fourth pair of acoustic receivers of the array to define a fourth radial line, the second acoustic transmitter is radially aligned with a fifth pair of acoustic receivers of the array to define a fifth radial line, and the second acoustic transmitter is radially aligned with a sixth pair of acoustic receivers of the array to define a sixth radial line; the fourth, fifth, and sixth radial lines forming respective second angles with the second wind angle reference line and forming a second set of acoustic receiver pairs;
wherein each of the first, second, and third pairs of acoustic receivers further comprises an inner acoustic receiver that is closer to the first acoustic transmitter and an outer acoustic receiver that is further from the first acoustic transmitter;
wherein each of the fourth, fifth, and sixth pairs of acoustic receivers further comprises an inner acoustic receiver that is closer to the second acoustic transmitter and an outer acoustic receiver that is further from the second acoustic transmitter; and
wherein the array is positioned to receive both the first and second acoustic signals; and
control circuitry configured to:
determine, for each of the first and second sets of acoustic receiver pairs, time difference of arrival (TDOA) of the first and second acoustic signals, respectively, from the inner acoustic receiver to the outer acoustic receiver;
determine, for each of the first and second sets of acoustic receiver pairs, a signal velocity of the first and second acoustic signals, respectively, based on a distance between the inner acoustic receiver and the outer acoustic receiver and a corresponding TDOA for each pair of acoustic receivers;
estimate a best fit circle using a best fit algorithm and a polar form of each of the signal velocities, wherein the best fit circle has a center $(c_x, c_y)$ and a radius $c_r$ on a representative x-y coordinate plane;
estimate one or more of wind angle, speed of sound, Mach number, and true airspeed of the airflow about the exterior of the vehicle based on parameters of the best fit circle; and
output the one or more of the wind angle, speed of sound, Mach number,
and true airspeed for operational control of the vehicle.

2. The acoustic air data system of claim 1,
wherein the control circuitry is configured to determine the wind angle of the airflow about the exterior of the vehicle based on the parameters of the best fit circle according to the following equation:

$$\alpha = \tan^{-1}\left(\frac{-c_y}{-c_x}\right)$$

wherein $\alpha$ is the wind angle of the airflow about the exterior of the vehicle;
wherein $c_x$ is an x-coordinate of the center of the best fit circle; and
wherein $c_y$ is a y-coordinate of the center of the best fit circle.

3. The acoustic air data system of claim 1,
wherein the control circuitry is configured to determine the speed of sound of the airflow about the exterior of the vehicle based on the parameters of the best fit circle according to the following equation:

$$C_o = c_r$$

wherein $C_o$ is the speed of sound of the airflow about the exterior of the vehicle; and
wherein $c_r$ is the radius of the best fit circle.

4. The acoustic air data system of claim 1,
wherein the control circuitry is configured to determine the Mach number of the airflow about the exterior of the vehicle based on the parameters of the best fit circle according to the following equation:

$$M = \sqrt{\frac{c_x^2 + c_y^2}{c_r}}$$

wherein M is the Mach number of the airflow about the exterior of the vehicle;
wherein $c_x$ is the x-coordinate of the center of the best fit circle;
wherein $c_y$ is the y-coordinate of the center of the best fit circle; and
wherein $c_r$ is the radius of the best fit circle.

5. The acoustic air data system of claim 1,
wherein the control circuitry is configured to determine the true airspeed of the airflow about the exterior of the vehicle based on the parameters of the best fit circle according to the following equation:

$$V = C_o M$$

wherein V is the true airspeed of the airflow about the exterior of the vehicle;
wherein $C_o$ is the speed of sound of the airflow about the exterior of the vehicle; and
wherein M is the Mach number of the airflow about the exterior of the vehicle.

6. The acoustic air data system of claim 1,
wherein the control circuitry is configured to estimate a first best fit circle for the first set of acoustic receiver pairs and a second best fit circle for the second set of acoustic receiver pairs.

7. The acoustic air data system of claim 6,
wherein the control circuitry is further configured to:
detect a fault when a first radius of the first best fit circle and a second radius of the second best fit circle differ by a predetermined threshold; and
remove outlier estimates corresponding to corrupted ones of the acoustic receivers when the fault is detected.

8. The acoustic air data system of claim 1,
wherein the acoustic receivers of the array are positioned at a center and vertices of a regular pentagon such that each of the acoustic receivers of the array defines a point on two different ones of the radial lines.

9. The acoustic air data system of claim 1,
wherein the first acoustic signal has a first frequency and the second acoustic signal has a second frequency.

10. The acoustic air data system of claim 1,
wherein the array of acoustic receivers is located downstream of the first and second acoustic transmitters with respect to a direction of the airflow about the exterior of the vehicle.

11. A method comprising:
transmitting, by a first acoustic transmitter, a first acoustic signal into airflow about an exterior of a vehicle, wherein the first acoustic transmitter is located along a first wind angle reference line;
transmitting, by a second acoustic transmitter, a second acoustic signal into airflow about an exterior of a vehicle, wherein the second acoustic transmitter is located along a second wind angle reference line, and the first and second wind angle reference lines are offset by an offset angle;
receiving the first and second acoustic signals at an array of acoustic receivers;

wherein the first acoustic transmitter is radially aligned with a first pair of acoustic receivers of the array to define a first radial line, the first acoustic transmitter is radially aligned with a second pair of acoustic receivers of the array to define a second radial line, and the first acoustic transmitter is radially aligned with a third pair of acoustic receivers of the array to define a third radial line; the first, second, and third radial lines forming respective first angles with the first wind angle reference line and forming a first set of acoustic receiver pairs;

wherein the second acoustic transmitter is radially aligned with a fourth pair of acoustic receivers of the array to define a fourth radial line, the second acoustic transmitter is radially aligned with a fifth pair of acoustic receivers of the array to define a fifth radial line, and the second acoustic transmitter is radially aligned with a sixth pair of acoustic receivers of the array to define a sixth radial line; the fourth, fifth, and sixth radial lines forming respective second angles with the second wind angle reference line and forming a second set of acoustic receiver pairs;

wherein each of the first, second, and third pairs of acoustic receivers further comprises an inner acoustic receiver that is closer to the first acoustic transmitter and an outer acoustic receiver that is further from the first acoustic transmitter; and wherein each of the fourth, fifth, and sixth pairs of acoustic receivers further comprises an inner acoustic receiver that is closer to the second acoustic transmitter and an outer acoustic receiver that is further from the second acoustic transmitter; and determining, for each of the first and second sets of acoustic receiver pairs, time difference of arrival (TDOA) of the first and second acoustic signals, respectively, from the inner acoustic receiver to the outer acoustic receiver;

determining, for each of the first and second sets of acoustic receiver pairs, a signal velocity of the first and second acoustic signals, respectively, based on a distance between the inner acoustic receiver and the outer acoustic receiver and a corresponding TDOA for each pair of acoustic receivers;

estimating a best fit circle using a best fit algorithm and a polar form of each of the signal velocities, wherein the best fit circle has a center ($c_x$, $c_y$) and a radius $c_r$ on a representative x-y coordinate plane;

estimating one or more of wind angle, speed of sound, Mach number, and true airspeed of the airflow about the exterior of the vehicle based on parameters of the best fit circle; and outputting the one or more of the wind angle, speed of sound, Mach number, and true airspeed for operational control of the vehicle.

12. The method of claim 11,
wherein determining the wind angle of the airflow about the exterior of the vehicle based on the parameters of the best fit circle comprises determining the wind angle according to the following equation:

$$\alpha = \tan^{-1}\left(\frac{-c_y}{-c_x}\right)$$

wherein $\alpha$ is the wind angle of the airflow about the exterior of the vehicle;

wherein $c_x$ is an x-coordinate of the center of the best fit circle; and wherein $c_y$ is a y-coordinate of the center of the best fit circle.

13. The method of claim 11,
wherein determining the speed of sound of the airflow about the exterior of the vehicle based on the parameters of the best fit circle comprises determining the speed of sound according to the following equation:

$$C_o = c_r$$

wherein $C_o$ is the speed of sound of the airflow about the exterior of the vehicle; and wherein $c_r$ is the radius of the best fit circle.

14. The method of claim 11,
wherein determining the Mach number of the airflow about the exterior of the vehicle based on the parameters of the best fit circle comprises determining the Mach number according to the following equation:

$$M = \sqrt{\frac{c_x^2 + c_y^2}{c_r}}$$

wherein M is the Mach number of the airflow about the exterior of the vehicle;

wherein $c_x$ is the x-coordinate of the center of the best fit circle;

wherein $c_y$ is the y-coordinate of the center of the best fit circle; and wherein $c_r$ is the radius of the best fit circle.

15. The method of claim 11,
wherein determining the true airspeed of the airflow about the exterior of the vehicle based on the parameters of the best fit circle comprises determining the true airspeed according to the following equation:

$$V = C_o M$$

wherein V is the true airspeed of the airflow about the exterior of the vehicle;

wherein $C_o$ is the speed of sound of the airflow about the exterior of the vehicle; and wherein M is the Mach number of the airflow about the exterior of the vehicle.

16. The method of claim 11,
wherein estimating the best fit circle comprises estimating a first best fit circle for the first set of acoustic receiver pairs and a second best fit circle for the second set of acoustic receiver pairs.

17. The acoustic air data system of claim 16, further comprising:
detecting a fault when a first radius of the first best fit circle and a second radius of the second best fit circle differ by a predetermined threshold; and
removing outlier estimates corresponding to corrupted ones of the acoustic receivers when the fault is detected.

18. The method of claim 11,
wherein the acoustic receivers of the array are positioned at a center and vertices of a regular pentagon such that each of the acoustic receivers of the array defines a point on two different ones of the radial lines.

19. The method of claim 11,
wherein transmitting the first acoustic signal comprises transmitting the first acoustic signal at a first frequency and transmitting the second acoustic signal comprises transmitting the second acoustic signal at a second frequency.

20. The method of claim 11,
wherein the array of acoustic receivers is located downstream of the first and second acoustic transmitters with respect to a direction of the airflow about the exterior of the vehicle.

* * * * *